United States Patent [19]

Rockenfeller et al.

[11] Patent Number: 5,628,205

[45] Date of Patent: *May 13, 1997

[54] REFRIGERATORS/FREEZERS INCORPORATING SOLID-VAPOR SORPTION REACTORS CAPABLE OF HIGH REACTION RATES

[75] Inventors: Uwe Rockenfeller; Lance D. Kirol, both of Boulder City, Nev.

[73] Assignee: Rocky Research, Boulder City, Nev.

[*] Notice: The term of this patent shall not extend beyond the expiration date of Pat. No. 5,441,716.

[21] Appl. No.: 390,678

[22] Filed: Feb. 16, 1995

Related U.S. Application Data

[63] Continuation-in-part of Ser. No. 104,427, Aug. 9, 1993, Pat. No. 5,441,716, Ser. No. 327,150, Oct. 21, 1994, Pat. No. 5,477,706, and Ser. No. 149,453, Nov. 9, 1993, Pat. No. 5,396,775, which is a division of Ser. No. 794,501, Nov. 19, 1991, Pat. No. 5,271,239, which is a continuation-in-part of Ser. No. 732,652, Jul. 19, 1991, Pat. No. 5,186,020, which is a continuation-in-part of Ser. No. 644,833, Jan. 23, 1991, abandoned, said Ser. No. 104,427, is a continuation-in-part of Ser. No. 931,036, Aug. 14, 1992, Pat. No. 5,328,671, and Ser. No. 975,973, Nov. 13, 1992, Pat. No. 5,298,231, which is a continuation of Ser. No. 320,562, Mar. 8, 1989, abandoned, said Ser. No. 327,150, is a continuation of Ser. No. 59,548, May 11, 1993, abandoned.

[51] Int. Cl.⁶ .................................................. F25B 17/08
[52] U.S. Cl. ................................................. 62/480; 62/112
[58] Field of Search ........................... 62/476–480, 494, 62/101–112; 423/299, 352; 95/128, 121, 139, 137, 141, 116

[56] References Cited

U.S. PATENT DOCUMENTS 992,560   5/1911   Heuser .
1,686,425   3/1928   Von Platen et al. .
1,833,901   12/1931   Hull .
1,881,568   10/1932   Henney .
1,908,413   5/1933   Elfving .
1,932,492   10/1933   Smith .

(List continued on next page.)

FOREIGN PATENT DOCUMENTS 664520   9/1965   Belgium .
0193747   9/1986   European Pat. Off. .
0196863   10/1986   European Pat. Off. .
0470886   12/1992   European Pat. Off. .
2679633   1/1993   France .
436988   11/1926   Germany .

(List continued on next page.)

OTHER PUBLICATIONS

*Revue Phys. Appl.*, vol. 18 (1983), pp. 107–112, Mauran et al.

*Refrigerating Engineering*, "Absorption Refrigeration with Solid Absorbents", by R.M. Buffington, pp. 137–142 (Sep. 1933).

*Refrigerating Engineering*, "Comfort Cooling in a Refrigerating Plant", by R.H. Smith, p. 152 (Sep. 1933).

(List continued on next page.)

*Primary Examiner*—William Doerrler
*Attorney, Agent, or Firm*—Jerry R. Seiler, Esq.

[57] ABSTRACT

A refrigerator and/or freezer incorporates one or more reactors containing a complex compound of a metal salt and a polar gas adsorbed thereon in which the volumetric expansion of the complex compound is restricted during adsorption, and which reactors comprise one or reaction chambers having a maximum means mass diffusion path length of less than about 15 mm, and/or a maximum thermal diffusion path length of less than 1.5 mm.

229 Claims, 4 Drawing Sheets

U.S. PATENT DOCUMENTS

| | | |
|---|---|---|
| 1,954,056 | 4/1934 | Miller . |
| 1,972,426 | 9/1934 | Noebel . |
| 1,987,911 | 1/1935 | Prickett . |
| 1,992,745 | 2/1935 | Elfving . |
| 2,019,356 | 10/1935 | Normelli . |
| 2,067,678 | 1/1937 | Nesselmann . |
| 2,088,276 | 7/1937 | Nesselmann et al. . |
| 2,167,264 | 7/1939 | Dunz . |
| 2,196,021 | 4/1940 | Merrill . |
| 2,236,575 | 4/1941 | Kogel . |
| 2,241,600 | 5/1941 | Hunsicker . |
| 2,253,907 | 8/1941 | Levine . |
| 2,257,735 | 10/1941 | Kleen . |
| 2,276,947 | 3/1942 | Kleen . |
| 2,326,130 | 8/1943 | Kleen . |
| 2,340,886 | 2/1944 | Kleen . |
| 2,340,887 | 2/1944 | Kleen . |
| 2,353,713 | 7/1944 | Kleen . |
| 2,353,714 | 7/1944 | Kleen . |
| 2,370,643 | 3/1945 | Kleen . |
| 2,374,184 | 4/1945 | Kleen . |
| 2,384,460 | 9/1945 | Kleen . |
| 2,393,241 | 1/1946 | Kleen . |
| 2,401,233 | 5/1946 | Kleen . |
| 2,461,262 | 2/1949 | Kleen . |
| 2,496,459 | 2/1950 | Kleen . |
| 2,513,148 | 6/1950 | Coons . |
| 2,521,538 | 9/1950 | Rees . |
| 2,528,004 | 10/1950 | Kleen . |
| 2,537,720 | 1/1951 | Wagner . |
| 2,539,986 | 1/1951 | Brace . |
| 2,557,373 | 6/1951 | Coons . |
| 2,587,996 | 3/1952 | Gross . |
| 2,649,700 | 8/1953 | Piper . |
| 2,715,817 | 8/1955 | Brodheim . |
| 2,801,706 | 8/1957 | Asker . |
| 2,945,554 | 7/1960 | Berly . |
| 2,989,383 | 6/1961 | Miller . |
| 3,167,399 | 1/1965 | Hansen, Jr. . |
| 3,280,591 | 10/1966 | Webster . |
| 3,411,318 | 11/1968 | Puckett . |
| 3,661,200 | 5/1972 | McNamara . |
| 3,742,727 | 7/1973 | Kaiser . |
| 4,183,227 | 1/1980 | Bouvin et al. . |
| 4,199,959 | 4/1980 | Wurm . |
| 4,205,531 | 6/1980 | Brunberg et al. . |
| 4,419,107 | 12/1983 | Roydhouse . |
| 4,468,717 | 8/1984 | Mathias . |
| 4,523,635 | 6/1985 | Nishizaki et al. . |
| 4,548,046 | 10/1985 | Brandon et al. . |
| 4,581,049 | 4/1986 | Januschkowetz . |
| 4,623,018 | 11/1986 | Takeshita et al. . |
| 4,637,218 | 1/1987 | Tchernev . |
| 4,638,646 | 1/1987 | Koseki et al. . |
| 4,694,659 | 9/1987 | Shelton . |
| 4,709,558 | 12/1987 | Matsushita et al. . |
| 4,722,194 | 2/1988 | Kantor . |
| 4,759,191 | 7/1988 | Thomas et al. . |
| 4,765,395 | 8/1988 | Paeye et al. . |
| 4,801,308 | 1/1989 | Keefer . |
| 4,822,391 | 4/1989 | Rockenfeller . |
| 4,848,994 | 7/1989 | Rockenfeller . |
| 4,875,915 | 10/1989 | Rockenfeller . |
| 4,881,376 | 11/1989 | Yonezawa et al. . |
| 4,885,016 | 12/1989 | Griffiths . |
| 4,901,535 | 2/1990 | Sabin et al. . |
| 4,906,258 | 3/1990 | Balat et al. . |
| 4,944,159 | 7/1990 | Crozat . |
| 4,949,549 | 8/1990 | Steidl et al. . |
| 4,956,977 | 9/1990 | Maier-Laxhuber et al. . |
| 4,974,419 | 12/1990 | Sabin et al. . |
| 4,976,117 | 12/1990 | Crozat et al. . |
| 4,993,239 | 2/1991 | Steidl et al. . |
| 5,024,064 | 6/1991 | Yonezawa et al. . |
| 5,025,635 | 6/1991 | Rockenfeller et al. . |
| 5,038,581 | 8/1991 | Maier-Laxhuber et al. . |
| 5,057,132 | 10/1991 | Lebrun et al. . |
| 5,157,937 | 10/1992 | Choung et al. . |
| 5,161,389 | 11/1992 | Rockenfeller et al. ............ 62/480 |
| 5,186,020 | 2/1993 | Rockenfeller et al. . |
| 5,272,891 | 12/1993 | Erickson . |
| 5,298,231 | 3/1994 | Rockenfeller et al. ............ 423/299 |
| 5,328,671 | 7/1994 | Rockenfeller . |

FOREIGN PATENT DOCUMENTS

| | | |
|---|---|---|
| 3509564 | 9/1986 | Germany . |
| 417044 | 12/1932 | United Kingdom . |
| 415488 | 3/1933 | United Kingdom . |
| 424456 | 4/1934 | United Kingdom . |
| 8500213 | 1/1985 | WIPO . |
| 9010491 | 9/1990 | WIPO . |
| WO9222776 | 12/1992 | WIPO . |

OTHER PUBLICATIONS

English Translation of French Patent No. 2679633.

English Translation of German Patent No. DE3509564 Abstract.

Physique Appliquee 18, "Optimisation des densities energetiques de systeme stockage chimique basee sur des reactions solide gaz . . . ," (Feb. 1983), pp. 107–112.

REFRIGERATORS/FREEZERS INCORPORATING SOLID-VAPOR SORPTION REACTORS CAPABLE OF HIGH REACTION RATES

This application is a continuation-in-part of U.S. patent application Ser. No. 08/104,427 filed Aug. 9, 1993, (U.S. Pat. No. 5,441,716, which is a continuation-in-part of Ser. No. 07/931,036 filed Aug. 14, 1992, (U.S. Pat. No. 5,328,671) and Ser. No. 07/975,973 filed Nov. 13, 1992, (U.S. Pat. No. 5,298,231) which is a continuation of Ser. No. 07/320,562 filed Mar. 8, 1989, abandoned, and is a continuation-in-part of application Ser. No. 08/327,150 filed Oct. 21, 1994 (U.S. Pat. No. 5,477,706) which is a continuation of Ser. No. 08/059,548 filed May 11, 1993 (abandoned) and is a continuation-in-part of application Ser. No. 08/149,453 filed Nov. 9, 1993, (U.S. Pat. No. 5,396,775) which is a divisional of Ser. No. 794,501, filed Nov. 19, 1991 (U.S. Pat. No. 5,271,239), which is a continuation-in-part of Ser. No. 07/732,652 filed Jul. 19, 1991, (U.S. Pat. No. 5,186,020), which is a continuation-in-part of Ser. No. 07/644,833 filed Jan. 23, 1991, abandoned.

BACKGROUND OF THE INVENTION

In the aforesaid patents and applications there are disclosed improved apparatus and methods for achieving high adsorption/desorption reaction rates between polar gases and certain metal salts. These adsorption/desorption reactions, often referred to as "absorption" or "chemisorption" in technical literature, yield complex compounds which are the basis for efficient refrigeration, thermal storage, heat pump and power systems having high energy density. The aforesaid disclosed methods result in increased or maximized reaction rates between the gas and the complex compound, i.e., the time it takes to adsorb or desorb a given amount of the gas into or from the complex compound, to yield increased or improved power that can be delivered by the system, i.e., more energy delivered over a period of time, which translates into greater cooling capability of the apparatus. In the aforesaid U.S. Pat. Nos. 5,298,231 and 5,328,671, improved complex compound reactors are disclosed in which the complex compound adsorbents are those created by optimizing the density of the complex compound by limiting its volumetric expansion formed during at least the initial adsorption reaction between the metal salt and the polar gas. The resulting complex compounds are those in which the adsorption and desorption reaction rates are increased as compared to reaction rates using a complex compound formed without restricting the volumetric expansion and controlling the density during such a reaction. The increase in the reaction rates is expressed as an increase in the number of moles of polar gas adsorbed and/or desorbed per mole of the complex compound per hour at adsorption or desorption cycle times of less than 60 minutes. The description of such methods, reactors and complex compounds of the aforesaid patents and applications are incorporated herein by reference.

In the aforesaid application Ser. No. 104,427 there are disclosed further improved methods and apparatus for achieving improved reaction rates incorporating sorption reactors having thermal and mass diffusion path lengths within important defined limits. The reactors and resulting reactions are capable of achieving a maximum power density per mass of adsorbent, maximum power density per mass of reactor and maximum power density per desired or needed reactor volume. The specific reaction parameters and apparatus features and components including heat and mass transfer path length ranges for achieving such results as described in the aforesaid application are incorporated herein by reference.

In aforesaid application Ser. No. 327,150 there are disclosed methods and apparatus for achieving improved heat rejection from an adsorbing reactor in solid-vapor sorption systems. The systems include apparatus in which the system refrigerant is used as the heat transfer fluid for cooling an adsorbing reactor, activation of a heat rejection loop for cooling an adsorbing reactor using displacement of the heat transfer fluid without requiring thermostat or solenoid valve control of the cooling loop, and for transferring heat from a single heat source to either of two reactors to provide continuous refrigeration or cooling. Such apparatus and methods described in the aforesaid application are also incorporated herein by reference.

SUMMARY OF THE INVENTION

The present invention is directed to refrigeration, cooling or freezing apparatus, more specifically, refrigerators and/or freezers, which may or may not be portable, incorporating reactors and methods described in the aforesaid incorporated patents and applications. Specific preferred apparatus include consumer leisure appliances such as small or portable or personal freezers, refrigerators or combination refrigerator/freezer units which may be installed in recreational vehicles, boats, automobiles or trucks and mini-bar refrigerators, household appliances such as refrigerators, freezers and combination units as well as commercial freezers, refrigerators and the like. The specific design and components of such apparatus will be disclosed in the detailed description hereinafter.

DETAILED DESCRIPTION

Figure 2:
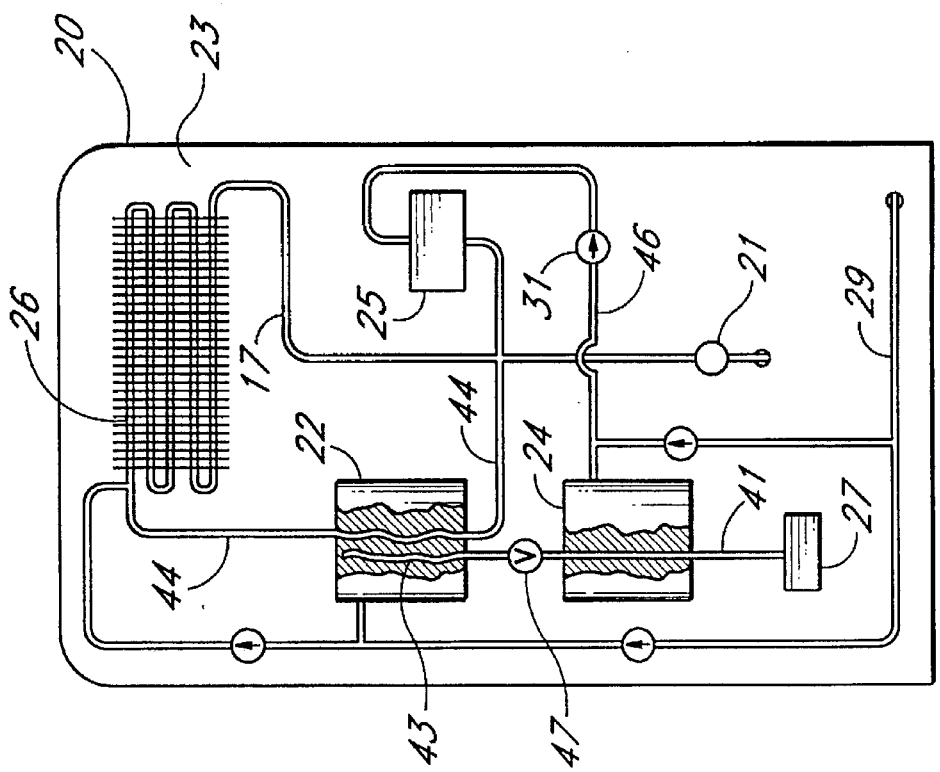
FIG. 2 shows another example of a refrigerator, freezer or combination appliance of the invention incorporating a two-stage constant pressure engine staging reactor system.

The cooling apparatus of the invention, including refrigerators, freezers or refrigerator/freezer combinations incorporate and utilize solid-vapor sorption reactors containing a complex compound formed by sorbing a polar gas on a metal salt and in which the adsorption reaction has been carried out by restricting the volumetric expansion of the complex compound formed. The polar gas or refrigerant used in the chemisorption reactions is capable of forming a covalent-like coordinative bond with the salt. The complex compounds are those disclosed in U.S. Pat. No. 4,848,994, the description of which is incorporated herein by reference, as are those described in the aforesaid incorporated copending applications. The preferred polar gaseous reactants are ammonia, water, sulfur dioxide, lower alkanols ($C_1$–$C_5$), alkylamines, polyamines and phosphine. Preferred metal salts include the nitrates, nitrites, perchlorates, oxalates, sulfates, sulfites and halides, particularly chlorides, bromides and iodides of alkali metals, alkaline earth metals, transition metals, particularly chromium, manganese, iron, cobalt, nickel, copper, tantalum and rhenium, as well as zinc, cadmium, tin and aluminum. Double metal chloride or bromide salts, in which at least one of the metals is an alkali or alkaline earth metal, aluminum, chromium, copper, zinc, tin, manganese, iron, nickel or cobalt are also useful. Another salt of special interest is $NaBF_4$. Other useful complex compounds are disclosed in U.S. Pat. Nos. 5,186,020 and 5,263,330 and are incorporated herein by reference. Preferred complex compounds used in the reaction of the invention are the following or comprise adsorption/desorption compositions containing at least one of the following as a component:

TABLE

| Complex Compound | X Value |
| --- | --- |
| $SrCl_2.X\ (NH_3)$ | 0–1, 1–8 |
| $CaCl_2.X\ (NH_3)$ | 0–1, 1–2, 2–4, 4–8 |
| $ZnCl_2.X\ (NH_3)$ | 0–1, 1–2, 2–4, 4–6 |
| $ZnBr_2.X\ (NH_3)$ | 0–1, 1–2, 2–4, 4–6 |
| $ZnI_2.X\ (NH_3)$ | 0–1, 1–2, 2–4, 4–6 |
| $CaBr_2.X\ (NH_3)$ | 0–1, 1–2, 2–6 |
| $CoCl_2.\ X\ (NH_3)$ | 0–1, 1–2, 2–6 |
| $CoBr_2.X\ (NH_3)$ | 0–1, 1–2, 2–6 |
| $CoI_2.X\ (NH_3)$ | 0–2, 2–6 |
| $BaCl_2.X\ (NH_3)$ | 0–8 |
| $MgCl_2.X\ (NH_3)$ | 0–1, 1–2, 2–6 |
| $MgBr_2.X\ (NH_3)$ | 0–1, 1–2, 2–6 |
| $MgI_2.X\ (NH_3)$ | 0–2, 2–6 |
| $FeCl_2.X\ (NH_3)$ | 0–1, 1–2, 2–6 |
| $FeBr_2.X\ (NH_3)$ | 0–1, 1–2, 2–6 |
| $FeI_2.X\ (NH_3)$ | 0–2, 2–6 |
| $NiCl_2.X\ (NH_3)$ | 0–1, 1–2, 2–6 |
| $NiBr_2.X\ (NH_3)$ | 0–1, 1–2, 2–6 |
| $NiI_2.X\ (NH_3)$ | 0–2, 2–6 |
| $SrI_2.X\ (NH_3)$ | 0–1, 1–2, 2–6, 6–8 |
| $SrBr_2.X\ (NH_3)$ | 0–1, 1–2, 2–8 |
| $SnCl_2.X\ (NH_3)$ | 0–2.5, 2.5–4, 4–9 |
| $SnBr_2.X\ (NH_3)$ | 0–1, 1–2, 2–3, 3–5, |
| $BaBr_2.X\ (NH_3)$ | 0–1, 1–2, 2–4, 4–8 |
| $MnCl_2.X\ (NH_3)$ | 0–1, 1–2, 2–6 |
| $MnBr_2.X\ (NH_3)$ | 0–1, 1–2, 2–6 |
| $MnI_2.X\ (NH_3)$ | 0–2, 2–6 |
| $CaI_2.X\ (NH_3)$ | 0–1, 1–2, 2–6, 6–8 |
| $CrCl_2.X\ (NH_3)$ | 0–3, 3–6 |
| $LiCl.X\ (NH_3)$ | 0–1, 1–2, 2–3, 3–4 |
| $LiBr.X\ (NH_3)$ | 0–1, 1–2, 2–3, 3–4 |
| $NaCl.X\ (NH_3)$ | 0–5 |
| $NaBr.X\ (NH_3)$ | 0–5.25 |
| $NaBF_4.X\ (NH_3)$ | 0.5–2.5 |
| $NaI.X\ (NH_3)$ | 0–4.5 |
| $K_2FeCl_4.X\ (NH_3)$ | 0–5, 5–6, 6–11 |
| $K_2ZnCl_4.X\ (NH_3)$ | 0–5, 5–12 |
| $Mg(ClO_4)_2.X\ (NH_3)$ | 0–6 |
| $Mg(NO_3)_2.X\ (NH_3)$ | 0–2, 2–4, 4–6 |
| $Sr(ClO_4)_2.X\ (NH_2)$ | 0–6, 6–7 |
| $CrBr_3.X\ (NH_3)$ | 0–3 |
| $CrCl_3.X\ (NH_3)$ | 0–3, 3–6 |
| $VCl_3.X\ (NH_3)$ | 0–3, 3–5, 5–6, 6–7, 7–12 |
| $AlCl_3.X\ (NH_3)$ | 0–1, 1–3, 3–5, 5–6, 6–7, 7–14 |
| $CuSO_4.X\ (NH_3)$ | 0–1, 1–2, 2–4, 4–5 |

Especially preferred are any of the $CaCl_2.\ X\ (NH_3)$ complexes, $SrCl_2.1$–$8\ (NH_3)$, $SrBr_2.2$–$8\ (NH_3)$, $CaBr_2.2$–$6\ (NH_3)$, $CaI_2.2$–$6\ (NH_3)$, $FeCl_2.2$–$6\ (NH_3)$, $FeBr_2.2$–$6\ (NH_3)$, $FeI_2.2$–$6\ (NH_3)$, $CoCl_2.2$–$6\ (NH_3)$, $CoBr_2.2$–$6\ (NH_3)$, $MgCl_2.2$–$6\ (NH_3\ )$, $MgBr_2.2$–$6\ (NH_3)$, $MnCl_2.2$–$6(NH_3)$ and $MnBr_2.2$–$6\ (NH_3)$, and mixtures thereof.

According to the invention, solid-gas sorption reactions, i.e., adsorption and desorption of the gas on the solid, are carried out under conditions and in apparatus intended to yield high power densities. Such reactions are preferably capable of achieving maximum power density per mass of adsorbent, maximum power density per mass of reactor and maximum power density per desired or needed reactor volume. Half-cycle times, i.e., adsorption or desorption reaction times of the reactions having improved reaction rates according to the present invention are carried out, at least for the discharge phase in less than 60 minutes, generally less than 30 minutes, preferably in less than about 20 minutes and typically between about 3 and about 15 minutes. It will be understood that not all applications require identical times for adsorption and desorption, and in some cases, one or both reactions may be as short as about 2 minutes, while in other cases, one of the reactions may extend a few minutes beyond 30 minutes. Moreover, during part load conditions, when the equipment is not expected to produce its full cooling capacity, refrigeration, heating or power, reaction times may be extended in order to limit the inherent process cycling and avoiding unnecessary thermal losses. It will be understood that total cycles or full cycle time periods also require a time period for adjusting or changing pressure between adsorption and desorption half-cycles. Thus, a full cycle time period comprises the sum of the half-cycle times plus two pressure-temperature adjustment times, the latter typically each of a few seconds, up to a few minutes.

Optimum reaction rates are dependent on a number of independent parameters including adsorbent density, the mass diffusion path length, the heat or thermal diffusion path length, as well as the thermodynamic operating conditions. The latter include the overall process conditions i.e., the specific temperature and pressure conditions in which the process is carried out, the differential pressure or $\Delta P$, i.e., the difference between the operating or system pressure and the equilibrium pressure of the complex compound, and the approach temperature or $\Delta T$, which is typically greater than 8° K. for the first adsorption reaction. Finally, the parameter of the specific salt and the complex compounds formed between the salt and a specific selected polar gas must be considered, it being understood that the characteristics of such salts and the resulting complex compounds, including the equilibrium pressures thereof, are important determinations in balancing the aforesaid parameters to optimize reaction conditions and achieve a system having maximized reaction rates. As sometimes used herein, the term "optimized reaction product" or "optimized complex compound" is a complex compound in which the polar gas sorption process on the metal salt is carried out under process conditions resulting in a complex compound reaction product having the aforesaid characteristics leading to an economic optimum.

Each reaction chamber or reactor module has dimensions which provide basis for measuring or determining the thermal diffusion path length (heat transfer) and the mass diffusion path length (mass transfer), respectively. The thermal path length is the distance from a highly thermally conductive surface to the center of the mass of complex compound. A heat conductive fin is an example of such a thermally conductive surface. In this example thermal diffusion in a given reactor is primarily a function of the fin count, i.e., the number of fins per unit of length (height) of the reactor modules. The greater the number of fins per unit of reactor length, the better the thermal diffusion and the less the thermal diffusion path length. The thermal diffusion path is the path from the most distant particle of complex compound to the nearest heat conductive surface. Thus, the simplified thermal path length is one-half the distance between two adjacent fins or plates. According to the invention, the thermal diffusion path length is less than 4.5 mm, preferably about 4 mm or less, and more preferably about 3.0 mm or less. Utilizing a group of preferred salts disclosed herein the most preferred thermal path length is between 0.6 and 3.2 mm. This is also equivalent of a fin count of at least 4 fins per inch, and preferably from about 9 to 25 fins per inch (1.4 mm to 0.5 mm thermal path length), or higher if practical for manufacture, for optimized power density requirements. The preferred thermal path length ranges for some specific salts are disclosed in aforesaid application Ser. No. 104,427. It will be understood that such a simplified path length determination does not take into consideration the tube wall, although that surface is also a contributor to the thermal path. Typical suitable and practical fin thickness will vary from about 0.07 mm to about 2 mm. Where thermal diffusion path lengths are relatively short, less fin thickness is usually preferred. The fin thickness is typically set to give a small temperature drop or rise in the fin as compared to desorption or adsorption approach temperature. The determination or measurement of the thermal path length can be readily determined for any three dimensional reaction chamber.

The size and shape of the fins or heat exchanger or thermal conducting surfaces is based on common heat transfer calculations understood by those skilled in the art. For example, the reactor may incorporate a plurality of heat exchange surfaces, fins or plates extending vertically radially along a heat exchange fluid conduit. Reactors of this type are illustrated in the aforesaid U.S. Pat. 5,298,231 and application Ser. No. 104,427. In this example the distance between the fins or plates varies because of the wedge-like shape of the different reaction chambers between adjacent plates which are not parallel. However, the average distance between two adjacent plates will be measured at a point halfway between the inner and outer edges of the respective plates. In reactors of a design in which fin height is quite low or small, or in which the fin count is low, the proximity of a salt or complex compound molecule to a prime heat transfer surface such as tubes or plates also becomes important in determining the thermal path length. Measurement and determination of the thermal path length may be made regardless of the shape or size of the adjacent solid fin or reaction chamber wall surfaces extending from and in thermal communication with the heat exchange conduit or conduits extending through the reactor. Such heat exchange surfaces, walls, plates or fins also usually comprise the gas impermeable reactor module walls which define or form the reaction chamber or chambers within the reactor. The reactor core may also comprise a tube fin reactor utilizing multiple tubes for directing heat transfer fluids through the reactor in thermal contact with the adsorption layer confined between the plates or fins and a gas permeable wall. This and other reactor examples are shown and described in the aforesaid application Ser. No. 104,427.

Although thermal diffusion path length is a highly important parameter, as set forth above, the mass diffusion path length, i.e., the path length of a refrigerant molecule to and from an adsorption particle or molecule, is also quite critical in reactors or reaction chambers in which the density of the reaction product mass has been controlled by limiting the volumetric expansion, according to the present invention. In order to achieve the high reaction rates according to the present invention a reactor or reaction apparatus must be designed for the capability of moving a substantial amount of refrigerant within the adsorbent mass in a relatively short period of time. For this reason, the mass diffusion path length of the reactor is of utmost importance. The mass diffusion path length is determined by measuring the distance between the point or surface of entry of the gas into the adsorbent mass (reaction chamber or module) to the opposite end or wall of the chamber, which represents the greatest distance the gas must travel to and from molecules or particles of complex compound during adsorption and desorption cycles. This dimension is readily determined for any reaction chamber size or shape. However, the important consideration in determining the desirable, preferred or optimized mass diffusion path lengths must take into account the entire mass of adsorbent particles relative to gas distribution means, i.e., port, vent, etc., from which the gas is directed into and from the adsorbent mass within the reaction chamber. It is also to be understood that the flow of refrigerant through the sorbent mass, to and from the adsorption sites, is not simply based on gas permeability or penetration through a porous medium, nor is it based only on gas penetration through a dense product mass contained in a limited volume. Instead, in the present chemisorption reaction process, the complex compound adsorbent changes its properties throughout the process as it coordinates and adsorbs the gas molecules. Since the coordination is typically a polar gas adsorbed on the complex compound in one or more coordination spheres, sorption rates are impacted by both the coordination site coverage and by the shielding resulting from accumulation of coordinated polar gas molecules facing incoming polar gas molecules during adsorption. Accordingly, the mass flow path length or mean mass diffusion path becomes extremely important and critical to achieving high reaction rates and power density according to the invention. Thus, in any reactor, not only is a maximum mass transfer distance to an adsorbent particle to be considered, but also the average or mean distance the gas must travel to and from all particles of the mass. As used herein, the term mean mass diffusion path length or distance is defined as the arithmetic mean over all particles of the shortest distance from every particle to a gas permeable surface bordering the compound, gas distribution inlet, outlet or other gas distribution means. Thus, the mean mass diffusion path length=

$$\frac{\sum_{i=1}^{n} d_i}{n}$$

where $d_i$=shortest distance from $i^{th}$ particle to a gas permeable surface and n=number of particles.

According to the invention, for rapid adsorption and desorption reactions sorbing a substantial amount of the theoretically available refrigerant coordination sphere in less than about 30 minutes and preferably less than 20 minutes, for at least the adsorption cycle (discharge phase), the mean mass diffusion path length is less than 15 mm, and preferably about 13 mm or less and more preferably less than 8 mm. In order to meet this critical requirement, the reactor or reaction chamber or chambers of the apparatus in which the adsorbent is present and the gas distribution components, i.e., tubes, reactor walls, channels, inlets, ports, vents etc., are preferably designed so that the mean mass diffusion path as defined above, in such a reactor is 15 mm or less. For the group of preferred salts disclosed herein, the most preferred mean mass diffusion path length is between 3 and 7 mm. It also preferred in the reactors or reaction chambers that at least 60% of the metal salt or the complex compound, by weight, is within 25 millimeters or less of a gas distribution means. The specific preferred mean mass diffusion path length range for some specific salts is disclosed in application Ser. No. 104,427.

From the above, it will be evident that both the thermal and mass diffusion path lengths may be changed or varied by selecting or designing a reactor having reaction chambers (modules) of desirable fin depth and reaction chamber height dimensions. An increase of the fin count, or number of fins per unit length of the reactor, will increase the system thermal conductivity and reduce the thermal path length. Likewise, the mass diffusion path length may be selected by selecting or designing a reactor having a greater or smaller distance between the gas permeable means through which the gaseous reactant passes during the alternate adsorption and desorption reaction phases, and the opposite end of the reaction chamber. For example, additional slots, gas tubing or gas permeable materials such as fire brick, porous cement, porous plastics, sintered metals or ceramics, wire mesh, etc., may be used in reactor assembly design for increasing gas inlet and outlet exposure for reducing mass diffusion path lengths. In designing or selecting reactors and reaction chamber configurations, these two independent parameters may be considered and selected to give a reactor having the reaction chambers of the desired heat diffusion and mass diffusion path lengths giving optimum or preferred reaction rates. Accordingly, optimum reactors capable of achieving desired reaction rates and power density according to the invention will have both thermal (heat) and mass diffusion path lengths as set forth above.

In designing reactor cores for optimizing the reactor module or reaction chamber dimensions pursuant to the invention, although relatively short gas diffusion paths are desirable from a reaction rate standpoint, the weight ratio of heat exchanger hardware to adsorbent may become prohibitive. In order to balance these features, the following principals may be applied. The heat transfer surface extension may be made of a thermally conductive and gas permeable material having less gas flow resistance than is encountered in the complex compound. For such an advantage the reactor core fin plates themselves may be designed to conduct gas through the fin or plate surface directly to the layer of adsorbent on each side of or otherwise in contact with the fin plate. Examples of suitable fin plate material include sintered and powdered metals, metal foams, or highly conductive non-metal ceramics or other porous materials. Utilizing such fin plates for both heat transfer and gas distribution, the mass transfer distance described above would no longer apply, since the distance between adjacent fins or plates would become both the heat and mass transfer path distance to be considered. Secondly, where the use of gas permeable reactor fin plates for both heat and mass transport is not desirable, gas permeable components or materials spaced between reactor fin plates may be used. Such gas permeable materials which are compatible with the solid reactant and gaseous refrigerant offer low gas resistance, and substantially enhance and contribute to increased gas distribution throughout the solid adsorbent.

A third means for increasing gas diffusion through the complex compound is by using a gas permeable or porous material added to the salt, with the mixture then being introduced into the reactor core. Of particular interest are materials which may be mixed with the adsorbent salt and which have geometries that offer a directional flow for gas through the salt and complex compound mass. Such materials are referred to herein as gas directional flow admixture components or gas distribution admixture compositions. These materials may be used to enhance the overall gas or refrigerant transport to and from the sorption sites of complex compounds or mixtures which contain complex compounds and comprise components having elongated or extended microporous surfaces such as micro-tubes or other suitable geometries of materials that are gas permeable and have a gas transport resistance lower than the complex compound adsorbent during adsorption and/or desorption. Further description and explanation of such materials are disclosed in application Ser. No. 104,427 and are incorporated herein by reference.

Another parameter to be determined is the mass of salt per unit volume of reaction chamber cavity, or loading density of the solid particulate metal salt introduced into the reactor and the optimum density of the resulting complex compound reaction product to achieve the optimum or desired reaction rates or power densities for adsorbing and desorbing the gaseous reactant to and from the complex compound. In order to achieve the desired or optimum density of the complex compound in a reactor having a fixed volume, the amount or volume of unreacted salt introduced into the reaction chambers must be sufficient so that when the complex compound reaction mass structure is produced during the sorption process reaction, the volumetric expansion results in each reaction chamber or module being filled with the newly formed complex compound structure composition having the desired density. Normally, the density of the complex compound formed will be lower than the density of the salt before the initial reaction, although the density of a fully adsorbed complex compound is often higher. The density of the complex compound, will also vary depending on the operating conditions, i.e., pressure and temperature. Each salt and complex compound will react somewhat differently at different temperatures and pressures. Thus, such operating conditions, as well as the equilibrium pressure of the complex compound and the approach pressure, must be considered. Accordingly, the optimized density for each complex compound under such operating conditions must also be independently determined. According to the invention, the loading density of the adsorbent salts for reacting with ammonia in the heat exchanger cavity is preferably between about 0.2 and 1.0 g/cc, and more preferably between about 0.3 and 0.8 g/cc but for salts having a high bulk or pour density, the loading density may exceed 1 g/cc in particular for adsorbents of relatively high molecular weight. However, according to the invention, these density ranges must also take into account the above disclosed heat and mass transfer parameters. Thus, the selection of a salt density within the aforesaid limits is to be used in a reactor or reaction chamber having a thermal diffusion path length, and/or a mass diffusion path length as set forth and described hereinabove. Preferred loading density ranges, mass diffusion path lengths and thermal diffusion path lengths for certain specific salts used with ammonia refrigerants are shown in Table I of the aforesaid application Ser. No. 104,427 and which information is incorporated herein by reference.

Specific improvements in the reaction rates by optimizing the heat diffusion and mass diffusion path lengths and the complex compound density result in substantial improvements and increase in the reactor economics. This improvement substantially impacts on the efficiency of the complex compounds and concomitantly, the amount of energy which can be provided by the system or apparatus in a given reaction cycle period. For example, in some equipment applications reaction rates of approximately 10–15 moles/mol-hr. imply half-cycle periods of about ten to twelve minutes, i.e., a ten minute time required for adsorbing or desorbing the desired amount of gaseous ligand from the complex compound. By comparison, reaction rates of 25 to 35 moles/mol-hr. imply half-cycle periods of about five to seven minutes, thereby approximately doubling the energy available from such a system for a given time period of operation. The high reaction rates obtained by using the optimized reactors as previously described are capable of being sustained not only for short cycle periods, but over periods of up to 20 minutes, or more. Thus, reaction rates of above 6 moles/mol-hr, typically 10–20 moles/mol-hr may be sustained for at least 6 minutes, typically up to 12–15 minutes and for some reactions up to 20–30minutes. The aforesaid reaction rate figures are averages, based on the average of the reaction rates up to the time when the reaction is complete or otherwise terminated.

Reactors of the invention, in which the volumetric expansion of the complex compounds is restricted during the sorption process reactions are capable of taking up, i.e., adsorbing and desorbing, at least 0.02 gram (20 milligrams) of $NH_3$ per minute and per cc of expanded adsorbent where reaction times are 30 minutes or less. Moreover, where the reaction times are limited to 30 minutes or less, such reactors are capable of taking up 0.01 gram (10 milligrams) of $NH_3$ per minute per cc of total reactor enclosure volume, i.e., within the total volume of the pressurized reactor enclosure, such process may be limited by possible early completion of the sorption if saturation is obtained in less than 30 minutes.

Reaction rates are typically dependent upon the degree of reaction completion. Equations of the form $$\Delta N = \Delta N_{max}(1-e^{-kt})$$

where:

$\Delta N$ = reaction extent (moles/mole)
$\Delta N_{max}$ = maximum reaction extent (moles/mole)
$t$ = time (sec)
$k$ = reaction kinetics value ($\sec^{-1}$)

(k is called herein reaction constant)
can be used to describe reaction progress over time. The above equation is put in a terminology and units useful for complex-compound sorption reactions of the present invention. The reaction constant k describes the time dependency of reaction progress for any time. Reaction rates can be obtained from an expression involving k and time:

$$\text{rate(mole/mole} - \text{hr)} = \frac{\Delta N}{(t \times 3600)} = \Delta N_{max} \frac{(1-e^{-kt})}{(t \times 3600)}$$

with units again convenient for the sorption reactions as described herein. As an example of using these equations, $SrCl_2$. $NH_3$ can complex up to 7 moles of ammonia in the 1 to 8 step, so $\Delta N_{max}$ is 7. For a time of 6 minutes (360 seconds) and k value of 0.004 $\sec^{-1}$, $\Delta N$ is 5.3 moles of ammonia per mole of salt. Reaction progression this far in 6 minutes requires an average rate over this 6-minute period of 53 moles/mole-hr. A reaction constant of 0.0004 gives $\Delta N$ of 0.94 in 6 minutes, or an average reaction rate of 9.4 moles/mole-hr. Given a reaction constant (k) for any sorber configuration with any salt, the extent of reaction completion and reaction rates at any time are readily determined. The actual amount of refrigerant adsorbed and rates do depend on the size of the sorption step, $\Delta N_{max}$. Sorption rates achievable by the present invention lead to the following minimum values for the reaction constant:

| $\Delta N_{max}$ | k |
|---|---|
| up to 4.5 moles/mole | 0.0004 |
| between 4.5 and 6 moles/mole | 0.0003 |
| above 6 moles/mole | 0.0002 |

Such reaction determinations are useful for adsorption and/or desorption periods of less than about 30 minutes.

The reactivity of the salts may be further enhanced by initially adsorbing a small amount of a gaseous ligand on the salt, which additive ligand is different from the gaseous reactant to be used in the complex compound. Any of the aforesaid polar gaseous reactants may be used, and particularly preferred are water, ammonia, lower molecular weight aliphatic alcohols, amines, or phosphine. The amount of the additive material is preferably between about 0.05% and about 10% by weight of the salt. The use of a hydrated salt containing a small but effective amount of water adsorbed on the salt may be satisfactory for such a purpose.

Figure 1:
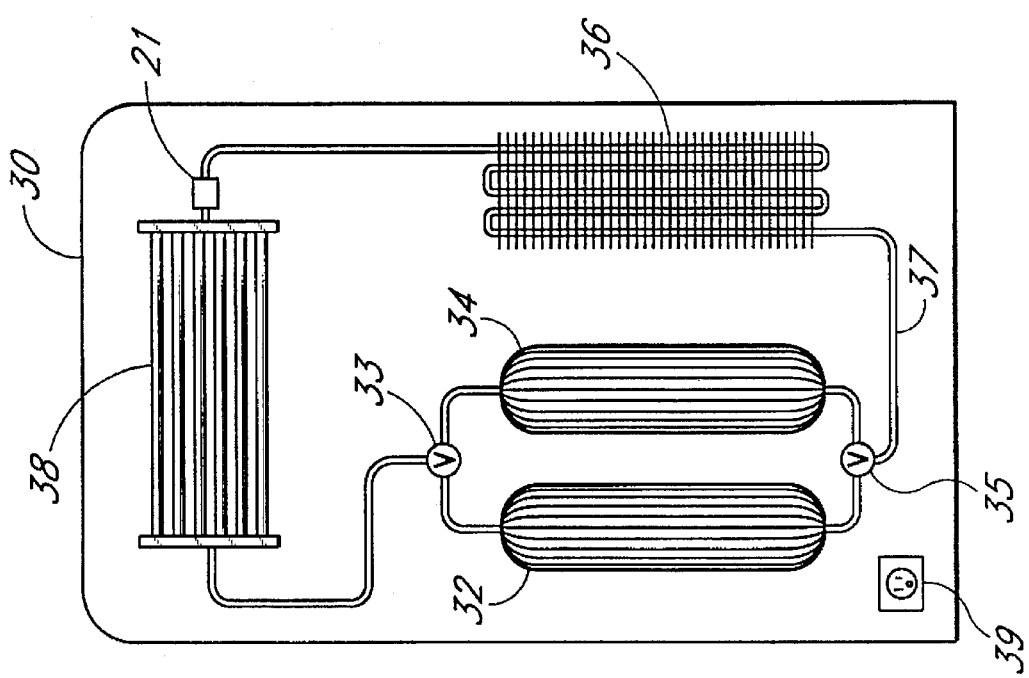
FIG. 1 illustrates one embodiment of the invention with the components of the cooling assembly used in a refrigerator, freezer or combination appliance.

In FIG. 1 there is illustrated a refrigerator, freezer, or refrigerator/freezer combination illustrating the components of the apparatus of the invention as used in such an appliance. It will be understood in FIGS. 1–5, that the back of an appliance is viewed for showing the functional cooling or refrigeration operating components including the reactors, condenser, evaporator, heat transfer fluid conduits, refrigerant conduits, valves, etc. The inside of the cooling apparatus or appliances comprises a refrigeration or cooling chamber or compartment which normally includes various shelving and subcompartments for keeping vegetables, fruits, meats, and the like, or a freezer compartment which also typically includes baskets, ice maker or ice bin rack, various storage racks, etc., or a combination refrigerator/freezer combining two such compartments. Such an appliance typically also includes a thermostat for selectively controlling the compartment temperature, as well as air handling means including one or more motors and fans for circulating cold air through the refrigerator and/or freezer compartments and may include means for automatically defrosting the apparatus, all of which are not a part of the present invention, are understood by those skilled in the art and need not be further explained herein. In the apparatus of FIG. 1, at the back of cabinet or container 30 are located two reactors 32 and 34, each containing the salt or complex compound previously described. The construction of the reactors including the interior reaction chambers or cores, the relative positioning or location of the heat fins for achieving the desired thermal diffusion path lengths, fin thicknesses and shapes as well as the description of the means for directing the refrigerant gas into, through and from the reaction chambers are disclosed in the aforesaid application Ser. No. 104,427, and are incorporated herein by reference.

The working components of the FIG. 1 apparatus further include a condenser 36 and evaporator 38 for condensing and evaporating the polar refrigerant gas, respectively, as well as conduits and one or more valves cooperating with the conduits for directing the polar refrigerant from the reactors to the condenser, from the condenser to the evaporator and from the evaporator to the reactors. The evaporator 38 is in thermal communication with the cooling chamber, i.e., refrigerator and/or freezer compartment of the appliance and is shown on the back of the apparatus for illustration only. The apparatus includes heating means cooperating with the reactors and in thermal communication with the metal salt and the resulting complex compound for heating the latter for driving desorption of the polar gas refrigerant from the complex compound during the sorption process. Such heating means is conveniently a resistive heating element to which energy is supplied via an electrical receptacle 39, also cooperating with a switching means, not shown, for selectively and alternately heating the two reactors during the sorption cycle process. However, other means for heating the reactors for driving the desorption reaction including using heated heat exchange fluids, steam, hot water, or hot gases of combustion may be used. For example, where the apparatus is to be used in a recreational vehicle, boat, camper, etc. heat provided from combustion of propane, butane or natural gas may be especially practical. During operation, one reactor is desorbing the polar refrigerant as the complex compound therein is heated, which desorbed gas is directed via valve 33 and conduit 37 into condenser 36, where it is condensed and thereafter directed through expansion valve 21 and into evaporator 38 where it absorbs heat to provide cooling to the refrigeration and/or freezing chamber(s) of the appliance. The gaseous refrigerant is then directed via conduit 31 and valve 33 to the other reactor, which is in the adsorbing phase of the chemisorption cycle. The reactors 32 and 34 may be of an air cooled design, as shown, including the exterior fins to assist in dissipating the heat created in the reactors by the complex compound during the exothermic adsorption reaction. Such heat dissipation may be further assisted by one or more fans, and the like. The shape and/or configuration of the reactors may be selected and designed to maximize efficient heat removal as will be understood by those skilled in the art. Although a single evaporator and condenser are shown, the apparatus may instead be designated to incorporate two or more evaporators and/or two or more condensers, especially in embodiments using a plurality of reactors, as shown, and as further described hereinafter. Thus, multiple evaporators may be used to split the cooling load and provide dual temperature cooling and/or freezing, for example, one evaporator for cooling the refrigerator compartment and one evaporator for cooling the freezer compartment. Alternatively, the apparatus may incorporate evaporator and condenser means comprising a single heat exchanger which alternates between evaporator and condenser functions, such as described in U.S. Pat. No. 5,186,020 and incorporated herein by reference. However, such an embodiment is usually only practical in a batch or intermittent operating apparatus where the sorbers are directly cooled, i.e., air cooled, such that the condenser function is not used or needed to reject sorber heat.

For continuous cooling/freezing operation, it may be desirable to operate the apparatus so that desorption is carried out more rapidly than the adsorption. Such operation will result in completion of the desorption reaction in the desorbing reactor earlier than completion of adsorption in the adsorbing reactor to provide continuous adsorption suction on the evaporator, whereby the $\Delta T$ downtime, i.e., the time it takes the evaporator to recover from switching reactor half-cycles, is minimized or avoided. To achieve such advantage, desorption will preferably be carried out at least 10% faster than adsorption, and more preferably the desorption time will be more than 25% faster than the adsorption reaction time.

Figure 6:
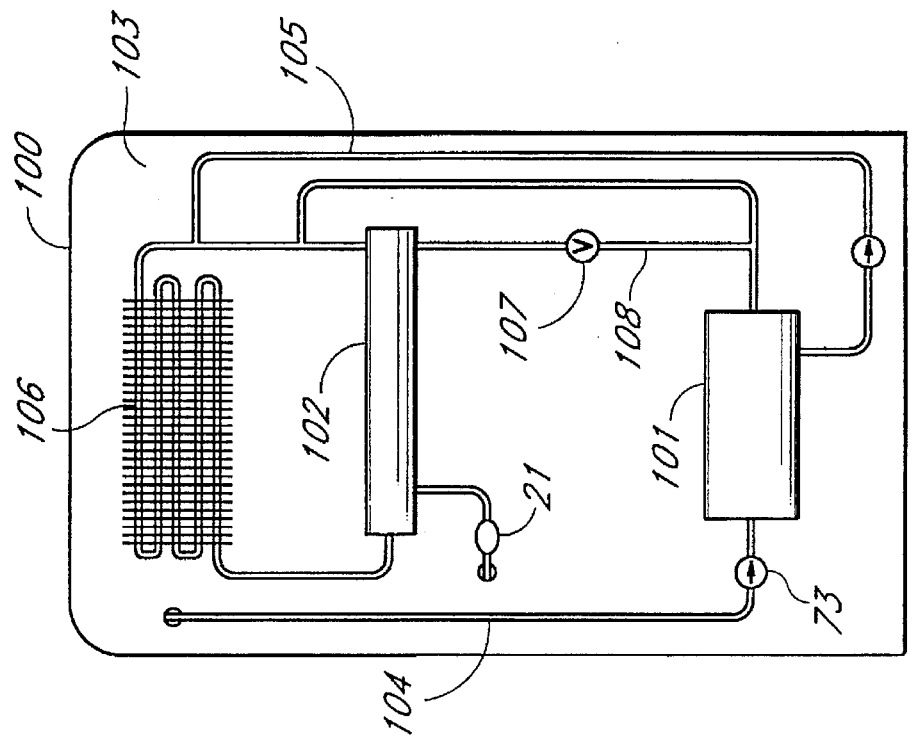
FIG. 6 illustrates a refrigerator and/or freezer incorporating a single reactor overflood apparatus.
Figure 5:
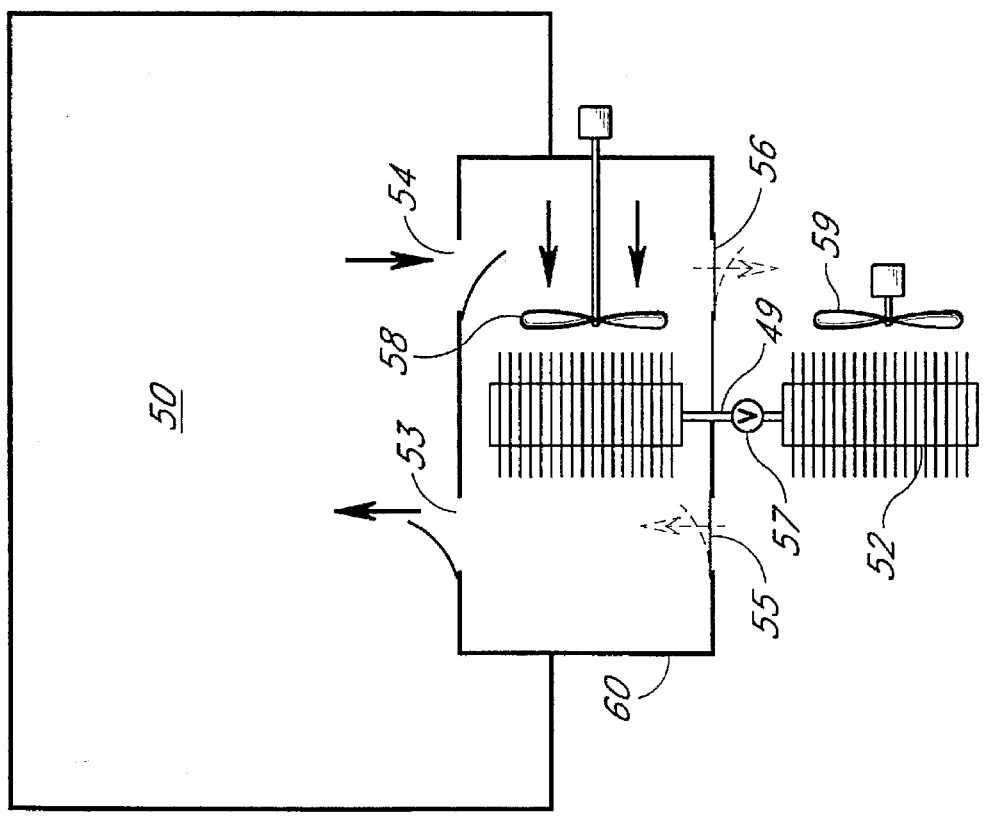
FIG. 5 schematically illustrates a cooling appliance of the invention incorporating a salt-salt reactor system.
Figure 7:
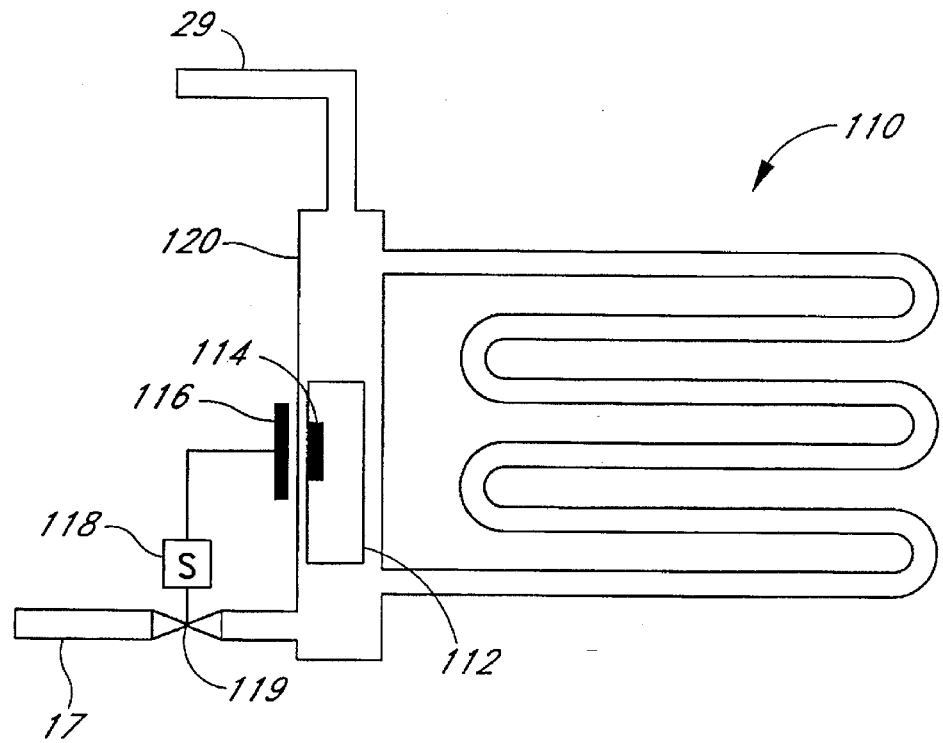
FIGS. 7 and 8 illustrate examples of float control devices which may be used as alternatives for an expansion valve used in the line feeding refrigerant to the evaporator.
Figure 8:
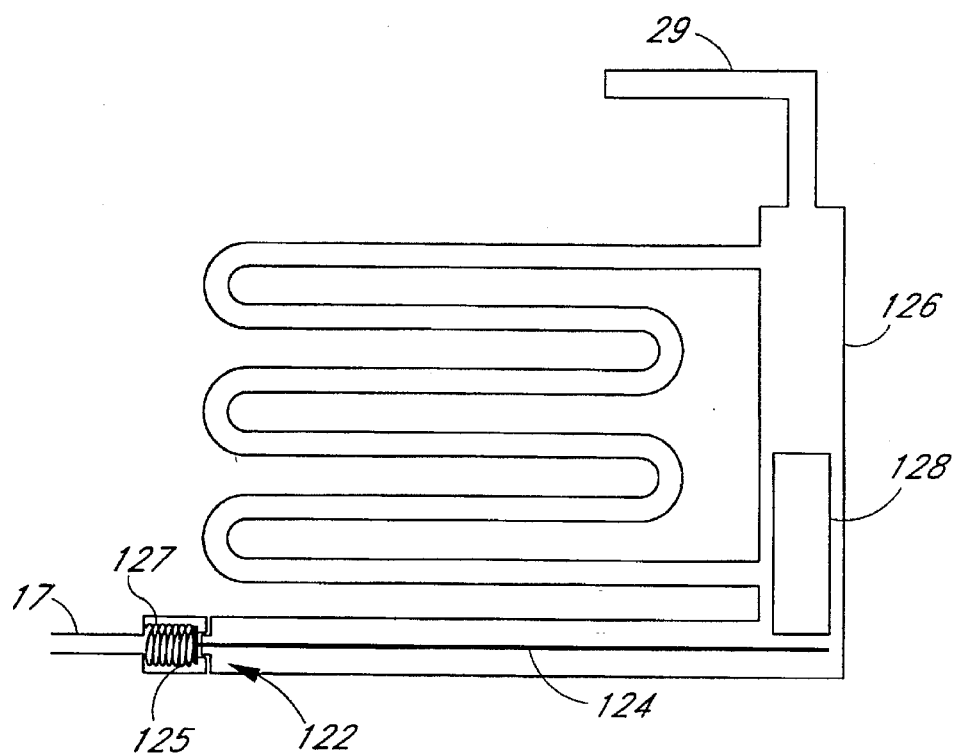

The specific salt or salts used in the reactors as well as the reactor design will depend on the nature of the appliance, i.e., cooler, refrigerator, freezer, or refrigerator/freezer combination as will the size and capacity of the appliance, which will also determine the condenser and evaporator capacities. Where the appliance is to operate only as a refrigerator, without a freezer compartment or capability, the complex compound selected for use in a reactor should be capable of providing evaporator temperatures of lower than 2° C., and preferably between −35° C. and −8° C. with refrigeration compartment temperatures below 10° C. and preferably below about 4° C. Where the appliance is to also have a freezer capacity, whether the freezer is in a separate compartment or is open to the refrigerator compartment, as it often is in smaller and less expensive appliances, the complex compound should be capable of providing evaporator temperatures of lower than −18° C., and typically between about −45° C. and −25° C. with a freezer compartment temperature below about −10° C. and preferably below about −18° C. For such evaporator temperatures, natural convection condenser operation, is typically between about 35° C. and 75° C., or between about 10° C. and about 45° C. above ambient temperature. The complex compound used in the reactors is also preferably capable of providing a temperature differential between the temperature of the complex compound during adsorption and the evaporator, i.e., an equilibrium T, of at least about 45° C., and preferably between about 50° C. and 75° C. for refrigerators without freezer capability. Where the appliance also has a freezer compartment or capability, the aforesaid equilibrium T should be at least 60° C. and preferably between about 65° C. and 150° C. The same aforesaid $\Delta T$ equilibrium temperatures given for an apparatus incorporating a phase change refrigerant as illustrated in FIG. 5, as well as FIGS. 6–8, is also valid for selection of the combination of salts in a salt-salt reactor configuration as illustrated in FIG. 9, and as will be explained further hereinafter. Specific examples of preferred salts and complex compounds for use in the reactors of a refrigerator only appliance include $CaCl_2.2$–4 $(NH_3)$, $CaCl_2.4$–8 $(NH_3)$, mixtures of the aforesaid, and $SrCl_2.1$–8 $(NH_3)$. Examples of preferred salts and complex compounds used for appliances having a freezer capability as described above also include $SrBr_2.2$–8 $(NH_3)$, $CaBr_2.2$–6 $(NH_3)$, $CaI_2.2$–6 $(NH_3)$, $FeCl_2.2$–6 $(NH_3)$, $FeI_2.2$–6 $(NH_3)$, $FeI_2.2$–6 $(NH_3)$, $CoCl_2.2$–6 $(NH_3)$, $CoBr_2.2$–6 $(NH_3)$, $MgCl_2.2$–6 $(NH_3)$, $MgBr_2.2$–6 $(NH_3)$, $MnCl_2.2$–6 $(NH_3)$, $MnBr_2.2$–6 $(NH_3)$ or mixtures of two or more thereof.

In FIG. 2 there is illustrated another embodiment of a refrigerator, freezer, or combination appliance of the invention utilizing two stage constant pressure engine staging for higher efficiency. The first reactor 22 contains a first complex compound and the second reactor 24 contains a different, second complex compound resulting in adsorption and desorption temperature differences between the reactors. In such an apparatus the different complex compounds of the two reactors are staged by directing the heat of adsorption of the second stage compound in reactor 24 to reactor 22 to drive desorption of the first stage compound. Such constant pressure engine staging "CPES" apparatus and methods are described in U.S. Pat. Nos. 5,079,928 and 5,263,330 the descriptions of which are incorporated herein by reference. The different complex compounds are selected such that the temperature of adsorption of the low vapor pressure compound in reactor 24 at low reaction pressure (adsorption) is at least 8° C. higher than the desorption temperature of the relatively high vapor pressure compound in reactor 22 at high reaction pressure (desorption). The apparatus shown, also includes a thermosyphon feature in which a heat transfer fluid, different from the refrigerant, is used for interstage heat transfer between the reactors. Refrigerant vapor desorbed from the second stage reactor 24 actuates a heat rejection thermosyphon in the first stage reactor 22. This thermosyphon initiates the adsorption and cools the reactor 22 during the adsorption reaction. The reactors are shown partially cut-away to schematically illustrate the separate heat transfer fluid and refrigerant flows. The apparatus includes conduits 41 and 43 and one or more cooperating valves 47 for directing a heat transfer fluid between the reactors at the appropriate time for the purpose of staging the reactions as described above. A selective heat source 27, which may comprise an electrical or gas heater, heats a heat transfer fluid directed to reactor 24 via conduit 41 and reactor 22 via conduit 43. The illustrated apparatus also includes a condenser 26 and conduit 28 for directing the desorbed gaseous refrigerant from reactor 22 to the condenser 26, and an expansion valve 21 located between the condenser and the evaporator, not shown, and which is located behind back plate or panel 23 in heat exchange communication with the cooling compartment of the apparatus. A reservoir 25 holds liquid refrigerant which is forced into a heat exchanger in reactor 22 via conduit 44 as the aforesaid heat rejection thermosyphon is activated by the pressure of desorbed gaseous refrigerant from reactor 24 via conduit 46. Valve 47 is closed during this reaction phase. In the half-cycle when the adsorption/desorption reactions are reversed, with valve 47 open, the heat transfer fluid heated by heat of adsorbing reactor 24 is directed to reactor 22 via conduit 43 for driving desorption therein. Refrigerant is directed from condenser 26 to the evaporator via conduit 17 and expansion valve 21, and from the evaporator to the reactors for respective adsorption via conduit 29 and cooperating one-way valves. Other means and components may be used for directing the heat transfer fluid in thermosyphon operation such as a bubble pump, ejector, or mechanical pump as disclosed in application Ser. No. 327,150 and as explained further hereinafter. According to this embodiment, the first stage relatively high vapor pressure complex compound in the first reactor 22 should have an equilibrium differential temperature (T) with the evaporator of at least 40° C., and preferably above about 45° C., and more preferably above at least 50° C. The second stage low vapor pressure complex compound in the second reactor 24 has an equilibrium temperature at adsorption conditions at least 8° C. greater than the equilibrium temperature of the first stage complex compound at desorption conditions to allow for heat flow from the adsorbing compound to the desorbing compound.

Preferred low vapor pressure complex compounds are $SrCl_2.1-8$ ($NH_3$), $CaCl_2.2-4$ ($NH_3$), $LiCl.0-3$ ($NH_3$), $SrBr_2.2-8$ ($NH_3$), $CaBr_2.2-6$ ($NH_3$), $FeCl_2.2-6$ ($NH_3$), $CoCl_2.2-6$ ($NH_3$), $FeBr_2.2-6$ ($NH_3$), $NiCl_2.2-6$ ($NH_3$), $CoBr_2.2-6$ ($NH_3$), $MgCl_2.2-6$ ($NH_3$), $MgBr_2.2-6$ ($NH_3$), $MnCl_2.2-6$ ($NH_3$), $MnBr_2.2-6$ ($NH_3$), $CuSO_4.2-4$ ($NH_3$), $SnCl_2.0-2.5$ ($NH_3$), $CaCl_2.0-1$ ($NH_3$), $CaCl_2.1-2$ ($NH_3$) or mixtures of two or more thereof. Preferred high vapor pressure complex compounds are $CaCl_2.4-8$ ($NH_3$), $CaCl_2.2-4$ ($NH_3$) and mixtures thereof, $SrCl_2.1-8$ ($NH_3$), $BaCl_2.0-8$ ($NH_3$), $LiCl.0-3$ ($NH_3$), $SrBr_2.2-8$ ($NH_3$), $CaBr_2.2-6$ ($NH_3$), $CuSO_4.2-4$ ($NH_3$), $NaBF_4.0.5-2.5$ ($NH_3$) and $NaBr.0-5.25$ ($NH_3$). Other complex compounds for staged multiple reactor apparatus including identification of low and high vapor pressure compounds are disclosed in U.S. Pat. Nos. Re.34,259, 5,079,928 and 5,263,330. Moreover, although only two reactors are illustrated in the embodiment of FIG. 2, the CPES apparatus may incorporate a plurality of three or more reactors each reactor containing a different complex compound, and in which the different reaction products have an ascending order of gaseous reactant vapor pressure whereby the adsorbing temperature of a lower vapor pressure reaction product at a low reaction pressure is higher than the desorption temperature of the next successive higher vapor pressure reaction product at a high reaction pressure. Of course, such an apparatus also includes the required plumbing for directing the heat transfer fluid successively between the reactors for directing heat of adsorption from the highest temperature reactor to the next lower temperature reactor, thereby staging the reactions as described in U.S. Pat. No. 5,079,928 and 5,263,330. Such apparatus may also incorporate a liquid subcooler and/or a vapor recouperator as disclosed in U.S. Pat. No. 5,263,330, the description of which is also incorporated herein by reference.

Figure 4:
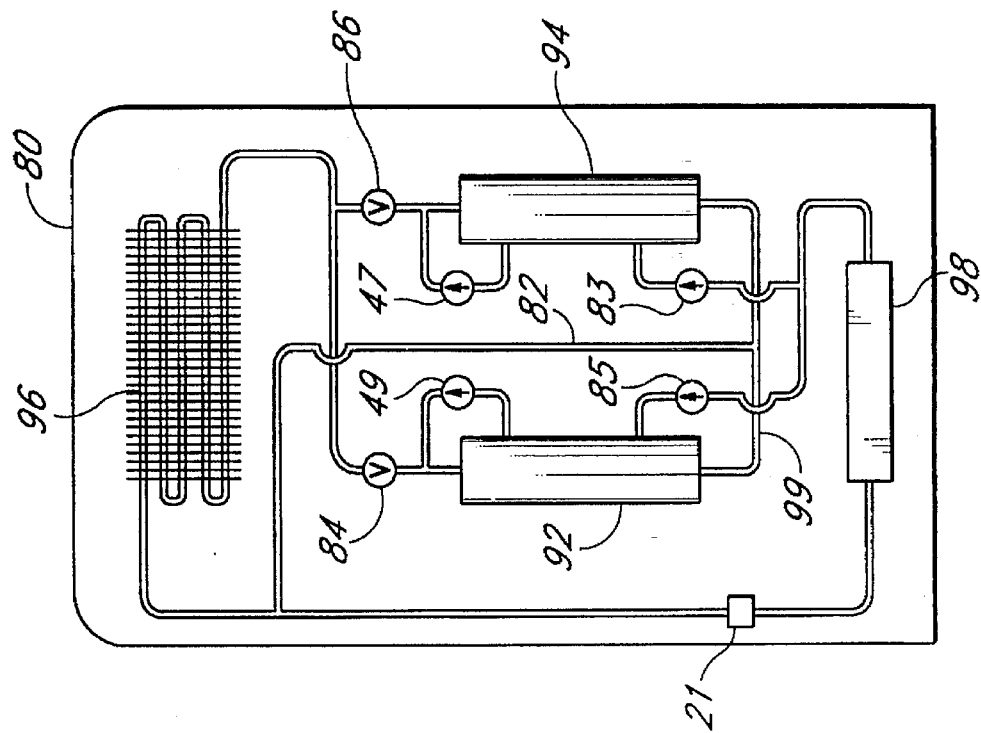
FIG. 4 illustrates cooling assembly components of a refrigerator, freezer or combination appliance incorporating a heat rejection loop.
Figure 3:
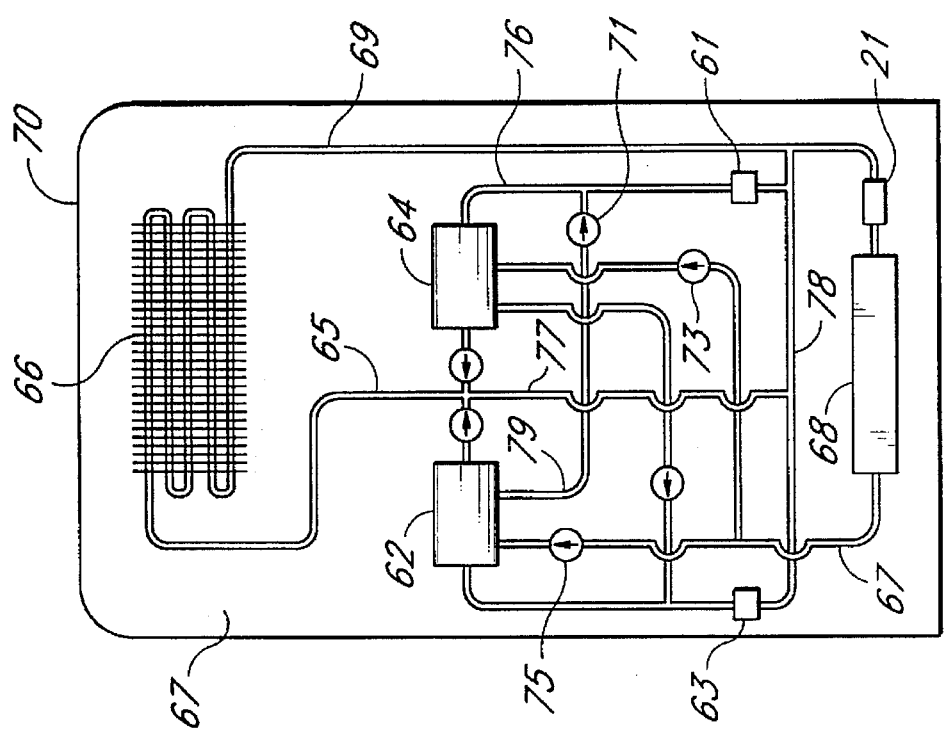
FIG. 3 illustrates an apparatus of the invention utilizing solid-vapor sorption reactors incorporating a vapor pump in which vaporized heat transfer fluid or refrigerant is used for driving a liquid heat transfer fluid in a reactor cooling loop.

In FIGS. 3 and 4 there are illustrated other embodiments of a refrigerator, freezer, or combination appliance of the invention in which the reactor assembly components are designed to provide a heat rejection conduit loop for rejecting heat from the reactors during their respective exothermic adsorption phases. Such a heat rejection conduit loop communicates with reactor heat exchange means in a variety of different configurations as described in the aforesaid application Ser. No. 327,150, the descriptions of which different embodiments, reactors and system configurations are incorporated herein by reference. Such an embodiment uses a phase change heat transfer fluid, either the system refrigerant, or a different heat transfer fluid, in the heat rejection conduit loop and in which the vaporized heat transfer fluid assists in driving liquid heat transfer fluid in the cooling loop. To achieve such functioning, the heat transfer fluid must be capable of having a phase change from liquid to gas at or below the temperature of the adsorbing reactor. The heat exchange fluid in at least partially liquid phase, i.e., liquid or a mixture of liquid and gaseous phases, is directed to the adsorbing reactor and exposed in heat exchange communication with the adsorbent composition, i.e., the metal salt or complex compound, and thereby is vaporized. The vaporized heat transfer fluid is then utilized in the heat rejection conduit loop for driving the liquid heat transfer fluid in the cooling loop. The adsorbing reactor or sorber to be adsorbed, is cooled to near ambient or near condenser temperature to lower the vapor pressure of the absorbent therein. As the cooled adsorbent vapor pressure drops below the evaporator pressure the sorber draws refrigerant vapor from the evaporator. This flow of refrigerant from the evaporator provides the refrigeration or cooling effect of the system. The control of the flow of refrigerant to and from the adsorbing reactor may be passive, for example, using check valves or back-pressure control valves, or the flow may be actively controlled, using for example, solenoid valves, or motor or pressure operated valves. Heat created during the exothermic adsorption reaction is removed to maintain the sorber at the proper adsorption temperature. While the adsorbing reactor is cooled to initiate adsorption, the other sorber is heated until the vapor of the adsorbent therein is greater than the condenser pressure, at which time refrigerant desorption to the condenser begins. Heat supplied to the desorption reactor provides the necessary energy required to drive the endothermic desorption and to overcome heat loss in the system. At the end of one sorption half-cycle or phase, the roles of the two sorbers are reversed. The apparatus shown in FIGS. 3 and 4 incorporate a thermosyphon heat transfer loop which provides or assists in circulation of the heat transfer fluid from the adsorbing reactor to the condenser. As used herein the term thermosyphon is intended to include any loop or system in which reactor cooling results from phase change of liquid heat transfer fluid or refrigerant, the condensate of which is returned to system liquid level by gravity. The systems may be designed to use the system refrigerant as the heat transfer fluid, or for use of different, separate compositions.

The sorbers or reactors may incorporate internal and/or external heat transfer surfaces. The condensers may incorporate natural or forced (fan) convective cooling. Different types of expansion devices such as a capillary tube, expansion valve, orifices, porous media, etc. may be used on the evaporator inlet. The check valves or one-way valves may be replaced by active control valves, such as solenoids. The heater elements for driving the desorption reaction may be mounted on heat-transfer surfaces, or embedded in the sorbers. Heating means may comprise electrical resistance wires or heaters, or use heat pipes, or pipes or tubes for heat transfer liquids, hot water or steam, or flue-gas tubes for directing hot gases of combustion, radiant heating, or any other suitable method of thermal conductance for directing heat to the complex compounds. The use of heat of combustion from propane, butane or natural gas burners to provide desorbing heat may be especially practical and desirable for household refrigerator and/or freezer appliances or where the appliances are designed for use in recreational equipment such as RV's, boats, campers, etc. Thus, the specific apparatus components shown in FIGS. 3 and 4 are for purposes of illustration only and the invention is not intended to be limited to the examples shown.

In FIG. 3 the solid-vapor adsorption refrigerator, freezer or refrigerator/freezer assembly includes a pair of reactors 62 and 64, condenser 66, and various conduits, one-way valves, heaters located on the outside of backplate 67 on the back of cabinet 70. Again the evaporator 68 is shown on the backplate for illustration only and will be in the refrigeration freezer compartment or in thermal communication with the compartment. The apparatus includes components and operates similarly to the apparatus shown in FIG. 1 of application Ser. No. 327,150. One of the reactors desorbs by energizing a heating element within the reactor to provide the necessary heat for driving the endothermic desorption reaction as previously described. In the system illustrated, the refrigerant is used as the gaseous reactant which is adsorbed and desorbed on the solid adsorbent, and as the heat transfer fluid for cooling the adsorbing reactor.

Operation of the illustrated apparatus in a half-cycle during which reactor 62 is desorbing while reactor 64 is absorbing is initiated by energizing a heater element in sorber 62 whereby the sorbent is heated until its vapor pressure is greater than the pressure in condenser 66. Once that occurs, refrigerant vapor flows from sorber 62 through pipe 79 and check valve 71 to vertical tube 76 which is connected to a heat transfer tube in sorber 64. Vapor flowing into the vertical tube 76 creates a "bubble-pump" effect and lifts liquid refrigerant standing in the tube to the heat transfer surfaces of a heat transfer tube in reactor 64. Thus, the heat transfer liquid directed into reactor 64 is a mixture of liquid and vapor phase refrigerant. As the liquid refrigerant vaporizes on the reactor heat transfer surfaces, completely or partially, it cools reactor 64 to near condenser temperature, and adsorption of the refrigerant on the sorbent begins. Heat generated by the exothermic adsorption reaction is removed by the vaporizing refrigerant, and the sorber is maintained within a few degrees of condenser temperature. The two-phase refrigerant mixture leaving reactor 64 is directed to a separator, typically a tee in the tubing as shown, with the vapor portion of the refrigerant directed to the condenser 66 via pipe 65, and liquid refrigerant portion returned to the tubing 78 below the sorbers via line 77. Vaporized refrigerant is condensed in condenser 66 and returned to the liquid in the lower tubing via pipe 69. Some liquid refrigerant in the lower tubing 78 is directed through expansion valve 21, to feed the evaporator 68. Gaseous refrigerant from the evaporator is directed via pipe 67 into the adsorbing reactor. One way valves 73 and 75 direct refrigerant to a reactor during the adsorption reaction phase. After completion of the above described half-cycle, the functions of the sorbers are reversed, with the heating element in reactor 62 deenergized and the heating element in reactor 64 energized. As the adsorbent in reactor 64 is heated sufficiently to begin desorption, the bubble-pump is activated to provide cooling to reactor 62, at which time adsorption therein begins. The closed conduit loop which directs refrigerant into the adsorbing reactor, on to the condenser and back to the reactor via the bubble pump forms the thermosyphon previously referred to.

Bubble pumps, comprising gas operated pumps often referred to as gas-lift pumps, used to provide condensed coolant to adsorbing reactor can be driven by vapor desorbed from the opposing reactor, as described above, or can be driven or assisted by a heater, typically electrical, on the vertical riser of the pump. The heater must be located on a vertical or nearly vertical tube or pipe and below the liquid level. Such heaters 61 and 63 shown in FIG. 3 are located on liquid refrigerant lines and generate vapor thus reducing density of the coolant in the vertical riser relative to liquid standing in the rest of the system. Thus, the reduced density coolant and vapor flow upward creating a pumping action. The advantage of using a heater instead of desorbed vapor for activation of the bubble pump is that it allows cooldown and adsorption of the reactor to begin before the opposing reactor is heated to desorption temperature and pressure. This advantage results in reduced total time for heatup and cooldown and an overall increase in the cooling power of the system. The same effect can also be achieved with a vapor pump in which a heater generates vapor in a tube of liquid heat transfer fluid or refrigerant and a check valve prevents backflow toward the system liquid reservoir, thus forcing coolant flow toward the adsorbing reactor heat transfer surface. With the check valve, the heater need not be in the vertical riser, orientation sensitivity is greatly reduced and less liquid head is required to feed the pump.

In FIG. 4, the schematic system shown is a pressure deactivated thermosyphon for transferring energy to the condenser 96. The apparatus, including cabinet 80, reactors 92 and 94, condenser 96 and evaporator 98 are operated utilizing the pressure deactivated thermosyphon in a manner as shown and described in FIG. 5 of the aforesaid and incorporated application Ser. No. 327,150. Thus, valves 84 and 86 are actively controlled, and when closed, force liquid refrigerant out of a heat transfer tube within a reactor utilizing pressure created within a desorbing reactor. During operation in a half-cycle in which sorber 92 is desorbing and sorber 94 is absorbing, with valve 84 closed, the heat transfer tubes in reactor 92 do not communicate with the condenser whereby pressure generated by heat forces liquid refrigerant out of the heat transfer tube, through conduit 99, and into the heat transfer tubes of reactor 94. Initial pressure to deactivate the thermosyphon circuit is provided by the reactor heaters or by auxiliary heaters located in the thermosyphon loop which may be activated just long enough to increase vapor pressure in the loop sufficient to initiate deactivation. However, once desorption begins, pressure of the desorbed vapor maintains the circuit deactivated thereby minimizing heater energy consumed to maintain pressure in the heat transfer tube. With valve 86 open, the refrigerant may pass through the reactor 94 to the condenser and vaporization of liquid refrigerant in reactor 94 cools it to adsorption temperature whereby adsorption therein begins. Refrigerant vaporization then continues to remove heat of absorption. Thus, open valve 86 activates a phase change thermosyphon heat transfer loop between reactor 94 and the condenser, while closed valve 84 deactivates the thermosyphon loop on the desorbing reactor 92 due to the pressure generated therein as previously described. At the end of the aforesaid half-cycle, the roles of the two sorbers are reversed, with heater in reactor 94 energized to start desorption, valve 86 is closed, the heater in reactor 92 is deenergized and valve 84 is opened. In both phases or half-cycles, refrigerant vapor flow to and from the sorbent salt is controlled by valves 83, 85, 47 and 49. These valves may be one-way check valves, or may be actively operated. The actively operated or actuated valves 83 and 86 may be solenoid valves, sequenced with the same control circuits used to energize and deenergize the heaters. Alternatively, the actively controlled valves may be piston operated valves driven by air pressure or by refrigerant vapor pressure generated in the desorbing reactor. Another variation of the above-described pressure deactivated thermosyphon system is illustrated in FIG. 6 of application Ser. No. 327,150 using 3-way valves controlled by pressure in the communicating sorber in place of the valves 84 and 86.

Although a preferred apparatus utilizes the refrigerant fluid as the phase change heat transfer fluid, as does an apparatus of FIGS. 3 and 4 thereby requiring only a single condenser for condensing the vaporized refrigerant, other of the systems shown in application Ser. No. 327,150 in which separate condensers are used for a two phase heat transfer fluid which is a different composition from the refrigerant may be used. Multiple condensers may be used herein regardless of the compositions of the heat transfer fluid even if the refrigerant is also used as heat transfer fluid. Where the heat transfer fluid is a different composition from the polar gaseous refrigerant, useful heat transfer fluids include water, alcohols, light hydrocarbons, heat transfer oils and DOWTHERM ® phase change heat transfer media. Thus, modification of the apparatus shown in FIGS. 3 and 4 to incorporate such separate condensers as shown in FIG. 7 of the aforesaid application Ser. No. 327,150 may be used. The two reactor systems of FIGS. 3 and 4 may be operated using the same complex compound in both reactors, or they may be operated as two stage discrete constant pressure engine staged (CPES) systems by using a different complex compound in each reactor as previously described regarding the apparatus of FIG. 2 and according to the description of U.S. Pat. Nos. 5,079,928 and 5,263,330. Of course, such CPES systems will include the necessary plumbing required for directing heat transfer fluid between the reactor heat transfer sections to carry out the temperature staging of the complex compounds.

In FIG. 5 there is shown a refrigerator, freezer, or combination refrigerator/freezer appliance illustrating an embodiment utilizing the reactor technology disclosed in aforesaid application Ser. No. 149,453 and U.S. Pat. No. No. 5,186,020, the descriptions of which are incorporated herein by reference. In the embodiment shown in FIG. 5, the apparatus incorporates two reactors or reactor assemblies (sorber units), each reactor or sorber unit containing a different vapor pressure complex compound. Such reactor assemblies include one or more individual reactors, typically comprising a plurality of elongated reactor cores or tubes containing the complex compound. First reactor 51 which cools the refrigerator/freezer compartment 50 contains a higher pressure (low temperature) complex compound and second reactor 52, a lower vapor pressure (higher temperature) complex compound. First reactor 51 is located in a housing 60 having a plurality of ports 53, 54, 55 and 56 provided with check valves, such as one-way flap valves as shown. Both reactors are designed with heat transfer fins for improved heat exchange. Second reactor 52 is provided with heating means, such as an electrical resistance heater or equivalent. Polar refrigerant, preferably ammonia, is directed between the reactors via conduit 49 preferably provided with a selectively adjustable valve 57. Fans 58 and 59 are provided for forced air heat transfer. Fan 58 may be reversible for alternately pulling air into the housing 60 from the interior of cooling chamber 50 via port 54, over the relatively cool desorbing reactor 51 and into the cooling chamber via port 53, and for pulling ambient atmospheric air into the housing via port 55, for cooling reactor 51 during adsorption, and venting to atmosphere via port 56. Alternatively, two separate fans may be used. Other equivalent means such as heat exchangers and using air or heat transfer fluids for heat exchange between the cooling chamber 50 and cooling reactor 51 may be used as disclosed in the aforesaid application Ser. No. 149,453 and U. S. Pat. No. 5,186,020.

With the respective complex compounds in reactor 51 adsorbed and in 52 desorbed, the system operates as follows: fan 59 is energized to cool reactor 52 and hold it near ambient temperature. As the reactor cools, it begins to adsorb refrigerant drawn from desorbing reactor 51 due to the equilibrium temperature differential between the two complex compounds. As first reactor 51 is desorbed, it becomes cool. When the reactor 51 is colder than the temperature in the refrigerator compartment 50, fan 58 is energized to force air in the direction illustrated by the arrows whereby air is drawn from the refrigerator cabinet 50 through port 54, over the heat exchange surfaces of reactor 51, and returned to the refrigerator cooling chamber. Thus, as reactor 51 desorbs, the air in the refrigerator compartment or chamber is cooled. When reactor 51 becomes sufficiently desorbed and reactor 52 adsorbed, fan 59 is deenergized, and the heating means for reactor 52 activated. At the same time, fan 58 in housing 60 is reversed whereby air is directed through port 55, over the heat transfer surface of reactor 51 and out of port 56, as shown by the dotted arrows. As reactor 52 becomes heated, it begins to desorb refrigerant and reactor 51 adsorbs. The heat of adsorption of reactor 51 is rejected by the ambient air flowing over the reactor as previously described. When reactor 51 is adsorbed, and reactor 52 desorbed, fan 59 is again energized and fan 58 deenergized. At this point, the reaction cycles have returned to the original condition described above. The reaction cycles then are repeated for cooling the refrigerator compartment. Thermostatic controls, not shown, may be used for operating the components, including the fans, heater for reactor 52, and valve 57. The aforesaid apparatus design is by way of example, and other equipment designs for such salt-salt refrigerators and/or freezers as described in the aforesaid patent and application may be used. Although only one pair of first and second reactors are shown in the embodiment of FIG. 5 such an apparatus may incorporate two or more pairs, each pair being operated in opposite or reverse cycles. Such an apparatus is also described in application Ser. No. 149,453 and is incorporated herein by reference.

In the salt-salt embodiment, it is important that the different complex compounds in the different first and second reactor assemblies have an equilibrium temperature differential of between about 20° C. and about 150° C., which is the difference between the two respective complex compound equilibrium temperatures at the same or substantially the same operating pressure, typically between about 0.1 and about 35 bars. Such an equilibrium temperature differential will provide sufficient practical temperature lift and yet be within practical safe ranges for heat rejection during exothermic polar refrigerant adsorption. A preferred refrigerant in this embodiment is ammonia. Preferred high pressure, low temperature complex compounds used in the first, cooling reactor 51 are ammonia complexes of $BaCl_2$, $CaCl_2$ and $SrCl_2$. Preferred complex compounds for the first reactors comprise $CaCl_2.4-8$ ($NH_3$), $CaCl_2.2-4$ ($NH_3$), or mixtures thereof, $SrCl_2.1-8$ ($NH_3$), $BaCl_2.0-8$ ($NH_3$), $NaBr.0-5.25$ ($NH_3$), or $NaBF_4.0.5-2.5$ ($NH_3$). The preferred complex compounds in the second reactors comprise $LiCl.0-3$ ($NH_3$), $SrBr_2.2-8$ ($NH_3$), $CaBr_2.2-6$ ($NH_3$), $CaCl_2.2-4$ ($NH_3$), $CoCl_2.2-6$ ($NH_3$), $SrCl_2.1-8$ ($NH_3$), $NiCl_2.2-6$ ($NH_3$), $FeCl_2.2-6$ 1 ($NH_3$), $FeBr_2.2-6$ ($NH_3$), $MnCl_2.2-6$ ($NH_3$), $MgCl_2.2-6$ ($NH_3$), $SnCl_2.0-2.5$ ($NH_3$), $NaBF_4.05-2.5$ ($NH_3$), $MnBr_2.2-6$ ($NH_3$), $MgBr_2.2-6$ ($NH_3$), $CuSO_4.2-4$ ($NH_3$), $CoBr_2.2-6$ ($NH_3$), $CaCl_2.0-1$ ($NH_3$), $CaCl_2.1-2$ ($NH_3$), or mixtures thereof.

In FIG. 6 there is shown another embodiment of the invention incorporating a single reactor system, which may be sometimes referred to as an overflood system. The refrigeration components utilized with the refrigerator and/or freezer 100 include a reactor 101, condenser 106, liquid reservoir 102, together with various conduits and cooperating valves for directing the refrigerant. An evaporator, not shown, is in heat exchange communication with the cooling chamber of the refrigerator, and is located behind back panel or plate 103. The liquid reservoir 102 is below the condenser 106 and above the reactor 101. During desorption, the refrigerant vapor is routed to condenser 106 via conduit 105, where it is condensed and thereafter the condensate collects in the reservoir 102. The reactor 101 is provided with a heater or heating means for heating the complex compound therein for driving the desorption reaction as previously explained. An efficient reactor design, for example, includes heater elements extending parallel to the sorber heat transfer surface and near the center of the finned-tube assembly which holds the salt. A special and important feature of this apparatus embodiment comprises a selectively operated valve for controlling the flow of liquid (condensed) refrigerant to the heat transfer section of the reactor for cooling the reactor for adsorption. During adsorption, the heater is turned off and valve 107 is opened and liquid from reservoir 102 floods the heat exchange surface in the reactor. The liquid refrigerant becomes vaporized, thus cooling the reactor, and the vaporized refrigerant is directed to the condenser via conduit 109. Circulation of the refrigerant through the condenser, reservoir, and reactor heat exchanger continues during the entire adsorption phase thereby maintaining the sorber near condenser temperature. Although a single reactor is illustrated, multiple reactors may be used.

Typically, operation of the system begins with desorption of the polar gas, preferably ammonia, from the reactor, with valve 107 closed and electric resistance heater in the reactor energized. As the refrigerant is driven off of the adsorbent, it is routed to the condenser, with one or more check valves 73 preventing backflow to the evaporator. At the end of the desorption period, the heater is deenergized, the valve 107 opened, and the liquid ammonia flows to the sorber heat exchange surface and is vaporized thereby cooling the reactor as previously described. As reactor cooling continues pressure of the desorbed complex compound continues to drop until it begins drawing refrigerant vapor from the evaporator. Thereafter, with sorption substantially completed, and with the reactor near to condenser temperature, valve 107 is again closed, the reactor heater energized, and the next desorption cycle begins. Valve 107 may be a solenoid valve, a heat-activated valve especially for use with gas firing, or may be any other valve operable for controlling liquid flow as required for cycle operation.

In the above-described apparatus an expansion valve is shown in the conduit or line directing liquid refrigerant from the condenser to the evaporator. However, other equivalent devices may be substituted for the expansion valve, examples of which are illustrated in FIGS. 7 and 8. Both of these devices utilize float controls in a float chamber for actuating or operating a valve for feeding liquid refrigerant to the evaporator assembly. In FIG. 7, a float system device includes a float chamber 120 in which a float 112 moves as it floats on the surface of the liquid refrigerant present in the float chamber. The float comprises any suitable light-weight material which is inert to the refrigerant. Where ammonia is the refrigerant, having a specific gravity as low as 0.55, examples of suitable float materials include polypropylene and nylon. Embedded or attached to the float 112 is a magnet 114 which is sensed by sensor 116 for operating solenoid valve 118. The solenoid valve includes a small orifice 119 between the liquid refrigerant feed conduit 17 and float chamber 120. The solenoid valve 118 opens and closes the small orifice. When the liquid refrigerant level in the float chamber 120 drops, as the float moves past the sensor 116, the solenoid valve is activated and the valve opens to allow the flow of liquid refrigerant into the chamber. The float chamber 120 also serves as a liquid-vapor separator to prevent liquid ammonia from entering the suction line or conduit 29 which leads to check valves in the conduit lines between the evaporator and the reactors, for example, as illustrated in FIG. 2.

FIG. 8 illustrates another type of float control device used in evaporator assembly 121 which may be referred to as a "whisker" valve and float apparatus. In this device, one end of an elongated wire or "whisker" 124 is attached to a plug 125 which is biased or forced against valve seat 122 utilizing a spring 127. A float 128 is positioned in float chamber 120, so that when the liquid level in the float chamber is low, the float contacts the end of whisker 124 opposite the valve seat. Movement of the whisker 124 is caused when the refrigerant level in float chamber 126 is low enough so that float 128 rests against the end of whisker 124 opposite the valve seat causing the plug 125 to become offset or tilted relative to valve seat 122 thereby allowing liquid refrigerant to enter the float chamber from conduit 17. The float may also be mechanically or physically linked or secured to the whisker whereby the whisker could be located above the float. Other physical modifications of the components illustrated may be used for achieving the same purpose and function. An advantage of utilizing the float control illustrated in FIG. 8 is the elimination of level sensors and solenoid valves and may be preferred in small cooling/refrigerating appliances. In addition to the above-described examples, virtually all conventional refrigerant expansion devices may be used, although passive expansion devices such as capillaries or orifices are much more difficult to apply to very small ammonia systems, and are increasingly difficult to use with periodic adsorption systems. Other useful valves include thermostatic expansion valves, constant pressure expansion valves, and electronic expansion valves. For pulse width modulated (on-off) electronic expansion valves used in very small refrigeration systems, it is useful to include a flow restriction (orifice or capillary) down stream of the valve, with controlled volume between the valve and the restriction. When the valve opens, this volume is filled and slowly bleeds to the evaporator. Required minimum pulse time of the valve is thus reduced.

The various refrigerator and/or freezer appliance embodiments disclosed herein may be scaled up or down as desired. For example, consumer leisure appliances such as small, portable or personal freezers, water or beverage coolers, ice makers, iced tea makers, refrigerators or refrigerator/freezer combination units as well as such appliances which may be installed in recreational vehicles, boats, automobiles or trucks, as well as mini-bar refrigerator, freezer, or combination units are those having a volume of up to about 200 liters or 7 cubic feet volume. Kitchen appliances including rapid freezers, standard refrigerator/freezer units and the like are in the 5 cubic feet to 35 cubic feet range, i.e., between about 100 and about 1,000 liters. Larger size commercial units are typically 30 cubic feet and larger. For example, retail display cases and walk-in freezers and refrigerators have cooling compartments typically between about 1000 and about 30,000 liters. Any of such devices and appliances may be portable so that they may be carried or transported to several distribution points during a working day and the contents or portion of the contents removed. For such an appliance, the use of DC electrical power from a transportation vehicle or other battery source for operating the apparatus illustrated in the various embodiments shown in the drawings may be provided. In addition, automatic or switchable transformer means so that the apparatus could also be operated on AC power may also be desirable. Again, the reactors in any of the cooling appliances disclosed herein may be heated with heat transfer fluids, steam, etc. or using hot gases of combustion from any practical or convenient sources. The appliances shown in the drawings and described herein may be used for vending or dispensing cold or frozen products including ice, ice cream, sherbert, frozen yogurt, etc. For such use the cabinet exterior of the appliance may be provided with display panels, indicia, lighting, etc. for advertising the products, as well as suitable vending or dispensing apparatus and components. The evaporator used in any of the above-described apparatus embodiments may also be designed for contact cooling/freezing as an alternative to the typical evaporator designed primarily for convective cooling as shown in the drawings. Thus, the evaporator may be shaped for substantial contact with a container holding the composition or goods to be rapidly frozen, or otherwise for conforming to a shape suitable for making such direct contact with products or goods to be cooled. Such contact may also be enhanced by using somewhat flexible or formable metal or plastic evaporator coils which may be formed or molded to achieve increased contact with goods, products or containers. Alternatively, the appliance may be designed with the evaporator outside of the cooling chamber, in thermal, heat exchange contact with the cooling chamber interior. Other specific appliance designs and features understood by those skilled in the art may be used. The apparatus may also be a component of a combination appliance which may be used for both rapid cooling and/or freezing, together with a microwave oven feature. Such an embodiment is described in U.S. Pat. No. 5,161,389, and is incorporated herein by reference. Such variations in design, size and operational components and features within the scope of the invention will be understood by those skilled in the art.

We claim:
1. A cooling apparatus comprising:
   (a) a cabinet, case or container having a cooling chamber therein;
   (b) one or more reactors each containing a complex compound formed by adsorbing a polar gas on a metal salt, and in which said reactors said polar gas is alternately adsorbed and desorbed on said complex compound, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal chloride or bromide, and wherein said complex compound is formed by restricting the volumetric expansion and controlling the density thereof during said adsorption of said polar gas on said metal salt, whereby said complex compound is capable of increased reaction rates in the number of moles of said polar gas adsorbed and/or desorbed per mole of said complex compound per hour at adsorption or desorption times of less than 60 minutes, respectively, as compared to a complex compound formed without restricting the volumetric expansion and controlling the density thereof, wherein said one or more reactors comprise one or more reaction chambers having a maximum mean mass diffusion path length of less than about 15 mm;
   (c) condenser means for condensing said polar gas and evaporator means thermally exposed to said cooling chamber for providing cooling therein and conduits for directing said polar gas from said one or more reactors to said condenser means, and from said evaporator means to said one or more reactors, and
   (d) heating means cooperating with said one or more reactors for heating said complex compound therein.

2. The cooling apparatus of claim 1 wherein said one or more reaction chambers have a maximum thermal diffusion path length of between about 0.6 and about 3 mm, a maximum mean mass diffusion path length of between about 2.5 and about 7 mm, and wherein said salt or said complex compound has a density of between about 0.2 and about 0.9 g/cc of reaction chamber volume.

3. The apparatus of claim 1 including a plurality of heat transfer fins extending along said reactor and in heat transfer communication with said metal salt, wherein the distance between said fins is 2.8 mm or less.

4. The apparatus of claim 1 wherein said one or more reaction chambers have a maximum thermal diffusion path length of less than about 4.5 mm.

5. The apparatus of claim 1 wherein said complex compound or said metal salt has a density in said reactor of between about 0.2 and about 1.0 g/cc of reaction chamber volume.

6. The apparatus of claim 1 including gas distribution means for directing said polar gas to and from said metal salt or said complex compound in said one or more reaction chambers, and wherein at least 60% of said metal salt or said complex compound, by weight, is within 25 mm or less of a gas distribution means.

7. The apparatus of claim 1 including one or more heat exchange surfaces in thermal contact with said metal salt and said complex compound and comprising a gas permeable material.

8. The apparatus of claim 1 including one or more gas permeable surfaces extending into said reaction chamber in contact with said metal salt and said complex compound along at least a portion of said gas permeable surface.

9. The apparatus of claim 1 wherein said metal salt and said complex compound comprise a mixture thereof, respectively, with a gas permeable admixture composition having a microporous surface for distributing said polar gas in said mixture.

10. A cooling apparatus comprising:

(a) a cabinet, case or container having a cooling chamber therein;

(b) one or more reactors each containing a complex compound formed by adsorbing a polar gas on a metal salt, and in which said reactors said polar gas is alternately adsorbed and desorbed on said complex compound, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal chloride or bromide, and wherein said complex compound is formed by restricting the volumetric expansion and controlling the density thereof during said adsorption of said polar gas on said metal salt, whereby said complex compound is capable of increased reaction rates in the number of moles of said polar gas adsorbed and/or desorbed per mole of said complex compound per hour at adsorption or desorption times of less than 60 minutes, respectively, as compared to a complex compound formed without restricting the volumetric expansion and controlling the density thereof, wherein said one or more reactors comprise one or more reaction chambers having a maximum thermal diffusion path length of less than 1.5 mm;

(c) condenser means for condensing said polar gas and evaporator means thermally exposed to said cooling chamber for providing cooling therein and conduits for directing said polar gas from said one or more reactors to said condenser means, and from said evaporator means to said one or more reactors, and (d) heating means cooperating with said one or more reactors for heating said complex compound therein.

11. The apparatus of claim 10 including gas distribution means for directing said polar gas to and from said metal salt or said complex compound in said reaction chambers, and wherein at least 60% of said metal salt or said complex compound, by weight, is within 25 mm or less of a gas distribution means.

12. The apparatus of claim 10 wherein said one or more reaction chambers have a maximum mean mass diffusion path length of less than about 15 mm.

13. The apparatus of claim 10 including one or more heat exchange surfaces in thermal contact with said metal salt and said complex compound and comprising a gas permeable material.

14. The apparatus of claim 10 including one or more gas permeable surfaces extending into said reaction chamber in contact with said metal salt and said complex compound along at least a portion of said gas permeable surface.

15. The apparatus of claim 10 wherein said metal salt and said complex compound comprise a mixture thereof, respectively, with a gas permeable admixture composition having a microporous surface for distributing said polar gas in said mixture.

16. A cooling apparatus comprising:

(a) a cabinet, case or container having a cooling chamber therein;

(b) one or more reactors each containing a complex compound formed by adsorbing a polar gas on a metal salt, and in which said reactors said polar gas is alternately adsorbed and desorbed on said complex compound, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal chloride or bromide, and wherein said complex compound is formed by restricting the volumetric expansion and controlling the density thereof during said adsorption of said polar gas on said metal salt, whereby said complex compound is capable of increased reaction rates in the number of moles of said polar gas adsorbed and/or desorbed per mole of said complex compound per hour at adsorption or desorption times of less than 60 minutes, respectively, as compared to a complex compound formed without restricting the volumetric expansion and controlling the density thereof, wherein said one or more reactors comprise one or more reaction chambers in which at least 60% of said metal salt or said complex compound, by weight, is within 25 mm or less of a gas distribution means;

(c) condenser means for condensing said polar gas and evaporator means thermally exposed to said cooling chamber for providing cooling therein and conduits for directing said polar gas from said one or more reactors to said condenser means, and from said evaporator means to said one or more reactors, and (d) heating means cooperating with said one or more reactors for heating said complex compound therein.

17. The apparatus of claim 16 wherein said one or more reaction chambers have a maximum thermal diffusion path length of less than 1.5 mm.

18. The apparatus of claim 16 including one or more heat exchange surfaces in thermal contact with said metal salt and said complex compound and comprising a gas permeable material.

19. The apparatus of claim 16 including one or more gas permeable surfaces extending into said reaction chamber in contact with said metal salt and said complex compound along at least a portion of said gas permeable surface.

20. The apparatus of claim 1 wherein said heating means comprises electrical resistance heating means.

21. The apparatus of claim 1 wherein said heating means comprises hot gases of combustion for heating said complex compounds.

22. The apparatus of claim 1 wherein said heating means comprises a heat transfer fluid for heating said complex compounds.

23. The apparatus of claim 1 wherein said heating means comprises one or more heat pipes for heating said complex compounds.

24. The apparatus of claim 1 wherein said apparatus comprises at least one cooling chamber having a volume of up to 1000 liters.

25. The apparatus of claim 1 wherein said apparatus comprises at least one cooling and/or freezing compartment having a volume of between about 1000 and about 30,000 liters.

26. The apparatus of claim 1 wherein said apparatus includes a freezer compartment.

27. The apparatus of claim 20 comprising a portable cooler and/or freezer.

28. The apparatus of claim 27 including a transformer for converting AC to DC for heating said electrical resistance heating means.

29. The apparatus of claim 1 comprising a dispensing or vending machine for products cooled in said cooling chamber.

30. The apparatus of claim 1 wherein said cooling chamber comprises separate refrigeration and freezer compartments, wherein said evaporator means is capable of −10° C., and wherein said apparatus includes heat exchanger means for directing cooling from said evaporator means for cooling the refrigeration compartment to a temperature below about 10° C.

31. The apparatus of claim 30 wherein said condenser means comprises a natural convection condenser capable of condensing said polar gas at between about 10° C. and 45° C. above ambient temperature.

32. The apparatus of claim 1 wherein said cooling chamber comprises a refrigeration compartment and wherein said evaporator means is capable of cooling said refrigeration compartment to a temperature below about 10° C.

33. The apparatus of claim 32 wherein the complex compound in said one or more reactors is capable of providing evaporator temperatures of between about −35° C. and about −8° C.

34. The apparatus of claim 32 wherein the complex compound in said one or more reactors is capable of providing a temperature differential between the temperature of said complex compound and the evaporator temperature during adsorption of at least about 45° C.

35. The apparatus of claim 34 wherein said complex compound comprises $CACl_2.2-4$ $(NH_3)$, $CACl_2.4-8$ $(NH_3)$, or mixtures thereof, $SRCl_2.1-8$ $(NH_3)$ or $SrBr_2.2-8$ $(NH_3)$.

36. The apparatus of claim 1 wherein said cooling chamber comprises a freezing compartment and wherein said evaporator means is capable of cooling said freezing compartment to a temperature below about 10° C.

37. The apparatus of claim 36 wherein the complex compound in said one or more reactors is capable of providing evaporator temperatures of between about −25° C. and about −45° C.

38. The apparatus of claim 36 wherein the complex compound in said one or more reactors is capable of providing a temperature differential between the temperature of said complex compound and the evaporator temperature during adsorption of at least about 60° C.

39. The apparatus of claim 38 wherein said complex compound comprises $CaCl_{2.x}(NH_3)$ complexes, $SrCl_2.1-8$ $(NH_3)$, $SrBr_2.2-8$ $(NH_3)$, $CaBr_2.2-6$ $(NH_3)$, $CaI_2.2-6$ $(NH_3)$, $FeCl_2.2-6$ $(NH_3)$, $FeBr_2.2-6$ $(NH_3)$, $FeI_2.2-6$ $(NH_3)$, $CoCl_2.2-6$ $(NH_3)$, $CoBr_2.2-6$ $(NH_3)$, $MgCl_2.2-6$ $(NH_3)$, $MgBr_2.2-6$ $(NH_3)$, $MnCl_2.2-6$ $(NH_3)$, $MnBr_2.2-6$ $(NH_3)$, or mixtures thereof.

40. The cooling apparatus of claim 1 comprising two or more of said reactors each having a different complex compound therein and including means for supplying a heat transfer fluid to and from said reactors and for directing the heat transfer fluid from an exothermic adsorption reaction to a reactor for driving an endothermic desorption reaction.

41. A cooling apparatus of claim 40 comprising three or more reactors, said complex compounds having an ascending order of gaseous reactant vapor pressure wherein the adsorption temperature of a lower vapor pressure complex compound at adsorption pressure is at least 8° C. higher than the desorption temperature of the next successive higher vapor pressure complex compound at desorption pressure.

42. The cooling apparatus of claim 40 wherein a high vapor pressure complex compound is selected from the group consisting of $CACl_2.4-8$ $(NH_3)$, $CACl_2.2-4$ $(NH_3)$ and mixtures thereof, $SRCl_2.1-8$ $(NH_3)$, $BaCl_2.0-8$ $(NH_3)$, $LiCl.0-3$ $(NH_3)$, $SrBr_2.2-8$ $(NH_3)$, $CaBr_2.2-6$ $(NH_3)$, $CuSO_4.2-4$ $(NH_3)$, $NaBF_4.0.5-2.5$ $(NH_3)$, and $NaBr.0-5.25$ $(NH_3)$, and mixtures thereof.

43. The cooling apparatus of claim 40 wherein a lower vapor pressure complex compound is selected from the group consisting of $SrCl_2.1-8$ $(NH_3)$, $CaCl_2.2-4$ $(NH_3)$, $LiCl.0-3$ $(NH_3)$, $SrBr_2.2-8$ $(NH_3)$, $CaBr_2.2-6$ $(NH_3)$, $FeCl_2.2-6$ $(NH_3)$, $CoCl_2.2-6$ $(NH_3)$, $FeBr_2.2-6$ $(NH_3)$, $NiCl_2.2-6$ $(NH_3)$, $CoBr_2.2-6$ $(NH_3)$, $MgCl_2.2-6$ $(NH_3)$, $MgBr_2.2-6$ $(NH_3)$, $MnCl_2.2-6$ $(NH_3)$, $MnBr_2.2-6$ $(NH_3)$, $SnCl_2.0-2.5$ $(NH_3)$, $CuSO_4.2-4$ $(NH_3)$, and $CaCl_2.0-1$ $(NH_3)$, $CaCl_2.1-2$ $(NH_3)$ and mixtures thereof.

44. The apparatus of claim 1 comprising a plurality of said reactors, said evaporator means including a first evaporator for providing cooling to a first cooling compartment and a second evaporator for providing cooling to a second cooling compartment.

45. The apparatus of claim 44 comprising one or more first reactors and one or more second reactors, said one or more first reactors containing a complex compound having a lower vapor pressure than the complex compound in said one or more second reactors.

46. The apparatus of claim 45 wherein said first evaporator is operatively connected to said one or more first reactors, and wherein said second evaporator is operatively connected to said one or more second reactors.

47. The apparatus of claim 46 including heat transfer components for directing a heat transfer fluid between said first and said second reactors for directing heat of adsorption from said first reactors for driving desorption reactions in said second reactors.

48. The cooling apparatus of claim 40 comprising one or more first reactors and one or more second reactors, said reactors including reactor heat exchange components for directing the heat transfer fluid in heat exchange exposure to the complex compound therein, a heat rejection conduit loop communicating with said reactor heat exchange components for rejecting heat from said one or more first and second reactors during adsorption therein, said loop including a first portion for directing vaporized heat transfer fluid from an adsorbing reactor to said condenser means, and a second portion for directing condensed heat transfer fluid from said condenser means to an adsorbing reactor, a heat transfer fluid located in said heat rejection conduit loop capable of a phase change from liquid to gas at a temperature at or below the temperature of adsorption in an adsorbing reactor, and vapor operated fluid displacement means cooperating with said second portion of said heat rejection conduit loop for displacing liquid phase heat transfer fluid therefrom to reactor heat exchange means.

49. The apparatus of claim 48 wherein said heat transfer fluid is the same composition as said polar gas.

50. The apparatus of claim 48 wherein said fluid displacement means comprises a pump.

51. A cooling apparatus of claim 1 comprising one or more first reactors and one or more second reactors, said reactors including reactor heat exchange means for directing the heat transfer fluid in heat exchange exposure to the complex compound therein, said apparatus including a heat rejection conduit loop communicating with said reactor heat exchange means for rejecting heat from said one or more first and second reactors during adsorption therein, said loop including a first portion for directing vaporized heat transfer fluid from an adsorbing reactor to said condenser means, and a second portion for directing condensed heat transfer fluid from said condenser means to an adsorbing reactor, a heat transfer fluid located in said heat rejection conduit loop capable of a phase change from liquid to gas at a temperature at or below the temperature of adsorption in an adsorbing reactor, and vapor operated fluid displacement means cooperating with said second portion of said heat rejection conduit loop for displacing liquid phase heat transfer fluid therefrom to reactor heat exchange means.

52. The apparatus of claim 51 wherein said heat transfer fluid is the same composition as said polar gas.

53. The apparatus of claim 51 wherein said fluid displacement means comprises a pump.

54. The apparatus of claim 53 wherein said pump comprises a gas operated pump having a generally vertical pipe containing liquid phase heat transfer fluid communicating with said reactor heat exchange means and with a second pipe for directing vaporized heat transfer fluid or desorbed polar gas to drive said liquid phase heat exchange fluid along said vertical pipe.

55. The apparatus of claim 51 wherein said fluid displacement means comprises a reservoir for holding liquid heat transfer fluid and includes one or more ejectors for pumping liquid refrigerant from said reservoir to said reactors.

56. The apparatus of claim 51 wherein said fluid displacement means comprises a heater cooperating with said second portion of said heat rejection conduit loop for heating liquid heat transfer fluid or condensed polar gas therein for pumping liquid heat transfer fluid or condensed polar gas to reactor heat exchange means for cooling an adsorbing reactor.

57. The apparatus of claim 56 including first one-way valves for preventing back flow of heated liquid heat transfer fluid or condensed polar gas along said second portion of said heat rejection conduit loop.

58. The apparatus of claim 51 including passageway means for directing desorbed polar gas from said solid adsorbent to said reactor heat exchange means.

59. The apparatus of claim 58 including a selectively operated valve cooperating with said passageway means and said first portion of said heat rejection conduit loop for selectively directing desorbed polar gas to said reactor heat exchange means during reactor desorption, and selectively directing polar gas from a reactor to a condenser during reactor adsorption.

60. The apparatus of claim 58 including pressure operated valves cooperating with said first portion of said heat rejection conduit loop and said passageway means and responsive to desorbed polar gas pressure for closing during reactor desorption thereby directing desorbed polar gas to said reactor heat exchange means during reactor desorption, and for opening during reactor adsorption thereby directing polar gas from a reactor to a condenser.

61. The apparatus of claim 57 wherein said condenser means comprises first and second condensers, said first condenser communicating with said heat rejection conduit loop for condensing said heat transfer fluid, and said second condenser communicating with said first and second reactors for condensing desorbed polar gas therefrom.

62. The apparatus of claim 61 including selectively operated valve means cooperating with said heat rejection conduit loop for selectively directing vaporized heat transfer fluid from a reactor to said first condenser during reactor adsorption and for directing heat transfer fluid from reactor heat exchange means to said fluid displacement means during reactor desorption.

63. The apparatus of claim 62, wherein said fluid displacement means comprises a reservoir communicating with said reactors for receiving desorbed polar gas therefrom, and communicating with said second condenser for receiving condensed polar gas therefrom.

64. The apparatus of claim 63 wherein said reservoir includes a heater cooperating therewith for heating refrigerant for displacing condensed refrigerant liquid from said reservoir to said reactor heat exchange means.

65. The apparatus of claim 51 wherein said first reactors contain a complex compound different from the complex compound in said second reactors.

66. The apparatus of claim 51 comprising a plurality of three or more reactors, each containing a different complex compound said complex compounds having an ascending order of gaseous reactant vapor pressure with the adsorbing temperature of a lower vapor pressure compound at a low reaction pressure being higher than the desorption temperature of the next successive higher vapor pressure compound at a high reaction pressure, and including means for directing heat transfer fluid between said reactors for rejecting heat of adsorption from the highest temperature reactor to the next lower temperature reactor.

67. The apparatus of claim 51 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $FeI_2$, $NiCl_2$, $ZnCl_2$, $SnCl_2$, $MnCl_2$, $MnBr_2$ or $CrCl_2$ or mixtures thereof.

68. The apparatus of claim 67 wherein said heat transfer fluid is ammonia.

69. The apparatus of claim 1 including a reservoir for receiving condensed polar gas from said condenser means and conduits for directing condensed polar gas from said condenser means to said reservoir and for directing liquid polar gas from said reservoir to said evaporator means.

70. The apparatus of claim 69 comprising a single reactor, wherein said condenser means comprises a condenser, and wherein said liquid holding reservoir is located above said reactor and below said condenser, whereby condensed polar gas is gravitationally directed from said condenser to said reservoir.

71. The apparatus of claim 70 wherein said reactor includes a reactor heat exchanger in heat exchange exposure to said complex compound therein, said apparatus including a conduit extending between said reactor heat exchanger and said reservoir and a selectively operated valve for opening and closing said conduit for controlling the flow of condensed polar gas from said reservoir to said reactor heat exchanger to cool said reactor for adsorption.

72. The apparatus of claim 1 including a float control device cooperating with a conduit and said evaporator means for feeding condensed polar gas to said evaporator means.

73. The apparatus of claim 72 wherein said float control device comprises a float chamber having a float therein and a valve actuated by movement of said float for directing condensed polar gas to said evaporator means in response to the position of said float in said float chamber.

74. The apparatus of claim 1 wherein said condenser means comprises one or more condensers and said evaporator means comprises one or more evaporators.

75. The apparatus of claim 1 wherein said condenser means and said evaporator means comprise a heat exchanger alternatively functioning as a condenser and an evaporator.

76. The apparatus of claim 75 including a reservoir for receiving condensed polar gas from said heat exchanger and including conduits for directing said condensed polar gas between said reservoir and said heat exchanger.

77. The apparatus of claim 1 wherein said polar gas is ammonia, and wherein said complex compounds are capable of adsorbing and/or desorbing at least 0.02 gram of ammonia per minute per cc of complex compound at reaction times of 30 minutes or less.

78. The apparatus of claim 1 wherein said polar gas is ammonia, and wherein said complex compounds are capable of adsorbing and/or desorbing at least 0.01 gram of ammonia per minute per cc of total reaction chamber volume at reaction times of 30 minutes or less.

79. A method of operating the cooling apparatus of claim 1 wherein said polar gas is ammonia, said method comprising repeatedly alternately adsorbing and desorbing ammonia on said complex compound at adsorption and desorption reactions at cycle time periods of less than about 30 minutes, respectively.

80. The method of claim 79 wherein said reaction rates are carried out to adsorb and/or desorb at least 0.01 gram of ammonia per minute per cc of total reaction chamber volume.

81. The method of claim 79 wherein said reaction rates are carried out to adsorb and/or desorb at least 0.02 gram of ammonia per minute per cc of complex compound.

82. The method of claim 79 wherein rates of reaction are determined by the formula.

$$\Delta N = \Delta N_{max}(1-e^{-kt})$$

where:

$\Delta N$=reaction extent (moles/mole)

$\Delta N_{max}$=maximum reaction extent (moles/mole)

t=time (sec)

k=reaction kinetics value (sec$^{-1}$)

wherein the reaction is carried out to a reaction extent of up to 4.5 moles/mole, and wherein the minimum value of k is 0.0004.

83. The method of claim 79 wherein rates of reaction are determined by the formula $$\Delta N = \Delta N_{max}(1-e^{-kt})$$

where:

$\Delta N$=reaction extent (moles/mole)

$\Delta N_{max}$=maximum reaction extent (moles/mole)

t=time (sec)

k=reaction kinetics value (sec$^{-1}$)

wherein the reaction is carried out to a reaction extent of between 4.5 and 6 moles/mole, and wherein the minimum value of k is 0.0003.

84. The method of claim 79 wherein rates of reaction are determined by the formula $$\Delta N = \Delta N_{max}(1-e^{-kt})$$

where:

$\Delta N$=reaction extent (moles/mole)

$\Delta N_{max}$=maximum reaction extent (moles/mole)

t=time (sec)

k=reaction kinetics value (sec$^{-1}$)

wherein the reaction is carried out to a reaction extent of above 6 moles/mole, and wherein the minimum value of k is 0.0002.

85. A method of operating the cooling apparatus of claim 1 comprising two of said reactors said method comprising repeatedly alternately adsorbing and desorbing said polar gas on said complex compound wherein the desorption cycle is carried out at least 10% faster than said adsorption cycle.

86. A cooling apparatus comprising:

(a) a cabinet, case or container having a cooling chamber therein;

(b) one or more first reactors and one or more second reactors, each of said first reactors containing a first, relatively high vapor pressure complex compound and each of said second reactors containing a second complex compound having a lower vapor pressure than said first complex compound, said first and second complex compounds formed by adsorbing a polar gas on a metal salt, and in which said one or more reactors said polar gas is alternately adsorbed and desorbed on said complex compound, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal chloride or bromide, and wherein said complex compound is formed by restricting the volumetric expansion thereof during said adsorption of said polar gas on said metal salt, whereby said complex compound is capable of increased reaction rates in the number of moles of said polar gas adsorbed and/or desorbed per mole of said complex compound per hour at adsorption or desorption times of less than 60 minutes, respectively, as compared to a complex compound formed without restricting the volumetric expansion thereof, wherein the equilibrium temperature of said first complex compound relative to evaporator temperature is at least 40° C.;

(c) a condenser and an evaporator for condensing and evaporating said polar gas, respectively, and conduits and valve means cooperating therewith for directing said polar gas from said one or more reactors to said condenser, from said condenser to said evaporator and from said evaporator to said one or more reactors said evaporator in thermal communication with said cooling chamber; and (d) heat transfer means in thermal communication with said first and second complex compounds in said first and second reactors, respectively, and heat transfer fluid conduits for directing a heat transfer fluid between said reactors whereby heat from an exothermic adsorption reaction in said one or more second reactors is directed to said one or more first reactors for driving an endothermic desorption reaction therein.

87. A cooling apparatus of claim 86 wherein the first complex compound is capable of providing an equilibrium temperature differential between the complex compound temperature during adsorption and the evaporator temperature of at least 40° C.

88. The cooling apparatus of claim 86 wherein said first complex compound is selected from the group consisting of $CaCl_2.4-8$ $(NH_3)$, $CaCl_2.2-4$ $(NH_3)$ and mixtures thereof, $SrCl_2.1-8$ $(NH_3)$, $BaCl_2.0-8$ $(NH_3)$, $LiCl.0-3$ $(NH_3)$, $SrBr_2.2-8$ $(NH_3)$, $CaBr_2.2-6$ $(NH_3)$, $CuSO_4.2-4$ $(NH_3)$, $NaBF_4.0.5-2.5$ $(NH_3)$, and $NaBr.0-5.25$ $(NH_3)$, and mixtures thereof.

89. The cooling apparatus of claim 86 wherein the second complex compound is capable of providing an equilibrium temperature at adsorption pressure at least 8° C. greater than the equilibrium temperature of said first complex compound at desorption pressure.

90. The cooling apparatus of claim 89 wherein said second complex compound is selected from the group consisting of $SrCl_2.1-8$ $(NH_3)$, $CaCl_2.2-4$ $(NH_3)$, $LiCl.0-3$ $(NH_3)$, $SrBr_2.2-8$ $(NH_3)$, $CaBr_2.2-6$ $(NH_3)$, $FeCl_2.2-6$ $(NH_3)$, $CoCl_2.2-6$ $(NH_3)$, $FeBr_2.2-6$ $(NH_3)$, $NiCl_2.2-6$ $(NH_3)$, $CoBr_2.2-6$ (N), $MgCl_2.2-6$ $(NH_3)$, $MgBr_2.2-6$ $(NH_3)$, $MnCl_2.2-6$ $(NH_3)$, $MnBr_2.2-6$ $(NH_3)$, $SnCl_2.0-2.5$ $(NH_3)$, $CuSO_4.2-4$ $(NH_3)$, and $CaCl_2.0-1$ $(NH_3)$, $CaCl_2.1-2$ $(NH_3)$, and mixtures thereof.

91. A cooling apparatus comprising:
(a) a cabinet, case or container having a cooling chamber therein;
(b) one or more first reactors and one or more second reactors, each of said first reactors containing a first complex compound and each of said second reactors containing a second complex compound different from said first complex compound, said first and second complex compounds formed by adsorbing a polar gas on a metal salt, and in which one or more reactors said polar gas is alternately adsorbed and desorbed on said complex compound, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal chloride, and wherein said complex compound is formed by restricting the volumetric expansion thereof during said adsorption of said polar gas on said metal salt, whereby said complex compound is capable of increased reaction rates in the number of moles of said polar gas adsorbed and/or desorbed per mole of said complex compound per hour at adsorption or desorption times of less than 60 minutes, respectively, as compared to a complex compound formed without restricting the volumetric expansion thereof, wherein the equilibrium temperature of said first complex compound differs from the equilibrium temperature of said second complex compound by between about 20° C. and about 150° C. at the same operating pressure, and wherein said one or more first reactors are thermally exposed to said cooling chamber for providing cooling therein, and wherein said one or more second reactors are substantially away from thermal exposure to said cooling chamber; and
(c) heating means cooperating with said one or more second reactors for selectively heating the said second complex compound for driving a desorption reaction therein.

92. The cooling apparatus of claim 91 wherein the first complex compound is selected from the group consisting of $CaCl_2 \cdot 4-8$ ($NH_3$), $CaCl_2 \cdot 2-4$ ($NH_3$) and mixtures thereof, $SrCl_2 \cdot 18-8$ ($NH_3$), $BaCl_2 \cdot 0-8$ ($NH_3$), $NaBF_4 \cdot 0.5-2.5$ ($NH_3$), and $NaBr \cdot 0-5.25$ ($NH_3$), and mixtures thereof.

93. The cooling apparatus of claim 91 wherein the second complex compound is selected from the group consisting of $SrCl_2 \cdot 1-8$ ($NH_3$), $CaCl_2 \cdot 2-4$ ($NH_3$), $LiCl \cdot 0-3$ ($NH_3$), $SrBr_2 \cdot 2-8$ ($NH_3$), $CaBr_2 \cdot 2-6$ ($NH_3$), $FeCl_2 \cdot 2-6$ ($NH_3$), $CoCl_2 \cdot 2-6$ ($NH_3$), $FeBr_2 \cdot 2-6$ ($NH_3$), $NiCl_2 \cdot 2-6$ ($NH_3$), $CoBr_2 \cdot 2-6$ ($NH_3$), $MgCl_2 \cdot 2-6$ ($NH_3$), $MgBr_2 \cdot 2-6$ ($NH_3$), $MnCl_2 \cdot 2-6$ ($NH_3$), $MnBr_2 \cdot 2-6$ ($NH_3$), $SnCl_2 \cdot 0-2.5$ ($NH_3$), $CuSO_4 \cdot 2-4$ ($NH_3$), $NaBF_4 \cdot 0.5-2.5$ ($NH_3$) and $CaCl_2 \cdot 0-1$ ($NH_3$), $CaCl_2 \cdot 1-2$ ($NH_3$), and mixtures thereof.

94. The apparatus of claim 10 wherein said condenser means and said evaporator means comprise a heat exchanger alternatively functioning as a condenser and an evaporator.

95. The apparatus of claim 16 wherein said condenser means and said evaporator means comprise a heat exchanger alternatively functioning as a condenser and an evaporator.

96. The apparatus of claim 27 wherein said condenser means and said evaporator means comprise a heat exchanger alternatively functioning as a condenser and an evaporator.

97. The apparatus of claim 75 comprising a portable cooler and/or freezer.

98. The apparatus of claim 94 comprising a portable cooler and/or freezer.

99. The apparatus of claim 95 comprising a portable cooler and/or freezer.

100. The apparatus of claim 10 wherein said heating means comprises electrical resistance heating means.

101. The apparatus of claim 10 wherein said heating means comprises hot gases of combustion for heating said complex compounds.

102. The apparatus of claim 10 wherein said heating means comprises a heat transfer fluid for heating said complex compounds.

103. The apparatus of claim 10 wherein said heating means comprises one or more heat pipes for heating said complex compounds.

104. The apparatus of claim 10 wherein said apparatus comprises at least one cooling chamber having a volume of up to 1000 liters.

105. The apparatus of claim 10 wherein said apparatus comprises at least one cooling and/or freezing compartment having a volume of between about 1000 and about 30,000 liters.

106. The apparatus of claim 10 wherein said apparatus includes a freezer compartment.

107. The apparatus of claim 100 comprising a portable cooler and/or freezer.

108. The apparatus of claim 107 including a transformer for converting AC to DC for heating said electrical resistance heating means.

109. The apparatus of claim 10 comprising a dispensing or vending machine for products cooled in said cooling chamber.

110. The apparatus of claim 10 wherein said cooling chamber comprises separate refrigeration and freezer compartments, wherein said evaporator means is capable of cooling the freezer compartment to a temperature below about −10° C., and wherein said apparatus includes heat exchanger means for directing cooling from said evaporator means for cooling the refrigeration compartment to a temperature below about 10° C.

111. The apparatus of claim 110 wherein said condenser means comprises a natural convection condenser capable of condensing said polar gas at between about 10° C. and 45° C. above ambient temperature.

112. The apparatus of claim 10 wherein said cooling chamber comprises a refrigeration compartment and wherein said evaporator means is capable of cooling said refrigeration compartment to a temperature below about 10° C.

113. The apparatus of claim 112 wherein the complex compound in said one or more reactors is capable of providing evaporator temperatures of between about −35° C. and about −8° C.

114. The apparatus of claim 112 wherein the complex compound in said one or more reactors is capable of providing a temperature differential between the temperature of said complex compound and the evaporator temperature during adsorption of at least about 45° C.

115. The apparatus of claim 114 wherein said complex compound comprises $CACl_2 \cdot 2-4$ ($NH_3$), $CACl_2 \cdot 4-8$ ($NH_3$), or mixtures thereof, $SrCl_2 \cdot 1-8$ ($NH_3$) or $SrBr_2 \cdot 2-8$ ($NH_3$).

116. The apparatus of claim 10 wherein said cooling chamber comprises a freezing compartment and wherein said evaporator means is capable of cooling said freezing compartment to a temperature below about −10° C.

117. The apparatus of claim 116 wherein the complex compound in said one or more reactors is capable of providing evaporator temperatures of between about −25° C. and about −45° C.

118. The apparatus of claim 116 wherein the complex compound in said one or more reactors is capable of providing a temperature differential between the temperature of said complex compound and the evaporator temperature during adsorption of at least about 60° C.

119. The apparatus of claim 118 wherein said complex compound comprises $CaCl_2._x(NH_3)$ complexes, $SrCl_2.1$–8 $(NH_3)$, $SrBr_2.2$–8 $(NH_3)$, $CaBr_2.2$–6 $(NH_3)$, $CaI_2.2$–6 $(NH_3)$, $FeCl_2.2$–6 $(NH_3)$, $FeBr_2.2$–6 $(NH_3)$, $FeI_2.2$–6 $(NH_3)$, $CoCl_2.2$–6 $(NH_3)$, $CoBr_2.2$–6 $(NH_3)$, $MgCl_2.2$–6 $(NH_3)$, $MgBr_2.2$–6 $(NH_3)$, $MnCl_2.2$–6 $(NH_3)$, $MnBr_2.2$–6 $(NH_3)$, or mixtures thereof.

120. The cooling apparatus of claim 10 comprising two or more of said reactors each having a different complex compound therein and including means for supplying a heat transfer fluid to and from said reactors and for directing the heat transfer fluid from an exothermic adsorption reaction to a reactor for driving an endothermic desorption reaction.

121. A cooling apparatus of claim 120 comprising three or more reactors, said complex compounds having an ascending order of gaseous reactant vapor pressure wherein the adsorption temperature of a lower vapor pressure complex compound at adsorption pressure is at least 8° C. higher than the desorption temperature of the next successive higher vapor pressure complex compound at desorption pressure.

122. The cooling apparatus of claim 120 wherein a high vapor pressure complex compound is selected from the group consisting of $CaCl_2.4$–8 (NH), $CaCl_2.2$–4 $(NH_3)$ and mixtures thereof, $SrCl_2.1$–8 $(NH_3)$, $BaCl_2.0$–8 $(NH_3)$, $LiCl.0$–3 $(NH_3)$, $SrBr_2.2$–8 $(NH_3)$, $CaBr_2.2$–6 $(NH_3)$, $CuSO_4.2$–4 $(NH_3)$, $NaBF_4.0.5$–2.5 $(NH_3)$, and $NaBr.0$–5.25 $(NH_3)$, and mixtures thereof.

123. The cooling apparatus of claim 120 wherein a lower vapor pressure complex compound is selected from the group consisting of $SRCl_2.1$–8 $(NH_3$ ), $CaCl_2.2$–4 $(NH_3)$, $LiCl.0$–3 $(NH_3)$, $SrBr_2.2$–8 $(NH_3)$, $CaBr_2.2$–6 $(NH_3)$, $FeCl_2.2$–6 $(NH_3)$, $CoCl_2.2$–6 $(NH_3)$, $FeBr_2.2$–6 $(NH_3)$, $NiCl_2.2$–6 $(NH_3)$, $CoBr_2.2$–6 $(NH_3)$, $MgCl_2.2$–6 $(NH_3)$, $MgBr_2.2$–6 $(NH_3)$, $MnCl_2.2$–6 $(NH_3)$, $MnBr_2.2$–6 $(NH_3)$, $SnCl_2.0$–2.5 $(NH_3)$, $CuSO_4.2$–4 $(NH_3)$, and $CaCl_2.0$–1 $(NH_3)$, $CaCl_2.1$–2 $(NH_3)$, and mixtures thereof.

124. The apparatus of claim 10 comprising a plurality of said reactors, said evaporator means including a first evaporator for providing cooling to a first cooling compartment and a second evaporator for providing cooling to a second cooling compartment.

125. The apparatus of claim 124 comprising one or more first reactors and one or more second reactors, said one or more first reactors containing a complex compound having a lower vapor pressure than the complex compound in said one or more second reactors.

126. The apparatus of claim 125 wherein said first evaporator is operatively connected to said one or more first reactors, and wherein said second evaporator is operatively connected to said one or more second reactors.

127. The apparatus of claim 126 including heat transfer components for directing a heat transfer fluid between said first and said second reactors for directing heat of adsorption from said first reactors for driving desorption reactions in said second reactors.

128. The cooling apparatus of claim 120 comprising one or more first reactors and one or more second reactors, said reactors including reactor heat exchange components for directing the heat transfer fluid in heat exchange exposure to the complex compound therein, a heat rejection conduit loop communicating with said reactor heat exchange components for rejecting heat from said one or more first and second reactors during adsorption therein, said loop including a first portion for directing vaporized heat transfer fluid from an adsorbing reactor to said condenser means, and a second portion for directing condensed heat transfer fluid from said condenser means to an adsorbing reactor, a heat transfer fluid located in said heat rejection conduit loop capable of a phase change from liquid to gas at a temperature at or below the temperature of adsorption in an adsorbing reactor, and vapor operated fluid displacement means cooperating with said second portion of said heat rejection conduit loop for displacing liquid phase heat transfer fluid therefrom to reactor heat exchange means.

129. The apparatus of claim 128 wherein said heat transfer fluid is the same composition as said polar gas.

130. The apparatus of claim 128 wherein said fluid displacement means comprises a pump.

131. A cooling apparatus of claim 10 comprising one or more first reactors and one or more second reactors, said reactors including reactor heat exchange means for directing the heat transfer fluid in heat exchange exposure to the complex compound therein, said apparatus including a heat rejection conduit loop communicating with said reactor heat exchange means for rejecting heat from said one or more first and second reactors during adsorption therein, said loop including a first portion for directing vaporized heat transfer fluid from an adsorbing reactor to said condenser means, and a second portion for directing condensed heat transfer fluid from said condenser means to an adsorbing reactor, a heat transfer fluid located in said heat rejection conduit loop capable of a phase change from liquid to gas at a temperature at or below the temperature of adsorption in an adsorbing reactor, and vapor operated fluid displacement means cooperating with said second portion of said heat rejection conduit loop for displacing liquid phase heat transfer fluid therefrom to reactor heat exchange means.

132. The apparatus of claim 131 wherein said heat transfer fluid is the same composition as said polar gas.

133. The apparatus of claim 131 wherein said fluid displacement means comprises a pump.

134. The apparatus of claim 133 wherein said pump comprises a gas operated pump having a generally vertical pipe containing liquid phase heat transfer fluid communicating with said reactor heat exchange means and with a second pipe for directing vaporized heat transfer fluid or desorbed polar gas to drive said liquid phase heat exchange fluid along said vertical pipe.

135. The apparatus of claim 131 wherein said fluid displacement means comprises a reservoir for holding liquid heat transfer fluid and includes one or more ejectors for pumping liquid refrigerant from said reservoir to said reactors.

136. The apparatus of claim 131 wherein said fluid displacement means comprises a heater cooperating with said second portion of said heat rejection conduit loop for heating liquid heat transfer fluid or condensed polar gas therein for pumping liquid heat transfer fluid or condensed polar gas to reactor heat exchange means for cooling an adsorbing reactor.

137. The apparatus of claim 136 including first one-way valves for preventing back flow of heated liquid heat transfer fluid or condensed polar gas along said second portion of said heat rejection conduit loop.

138. The apparatus of claim 131 including passageway means for directing desorbed polar gas from said solid adsorbent to said reactor heat exchange means.

139. The apparatus of claim 138 including a selectively operated valve cooperating with said passageway means and said first portion of said heat rejection conduit loop for selectively directing desorbed polar gas to said reactor heat exchange means during reactor desorption, and selectively directing polar gas from a reactor to a condenser during reactor adsorption.

140. The apparatus of claim 138 including pressure operated valves cooperating with said first portion of said heat rejection conduit loop and said passageway means and responsive to desorbed polar gas pressure for closing during reactor desorption thereby directing desorbed polar gas to said reactor heat exchange means during reactor desorption, and for opening during reactor adsorption thereby directing polar gas from a reactor to a condenser.

141. The apparatus of claim 137 wherein said condenser means comprises first and second condensers, said first condenser communicating with said heat rejection conduit loop for condensing said heat transfer fluid, and said second condenser communicating with said first and second reactors for condensing desorbed polar gas therefrom.

142. The apparatus of claim 141 including selectively operated valve means cooperating with said heat rejection conduit loop for selectively directing vaporized heat transfer fluid from a reactor to said first condenser during reactor adsorption and for directing heat transfer fluid from reactor heat exchange means to said fluid displacement means during reactor desorption.

143. The apparatus of claim 142, wherein said fluid displacement means comprises a reservoir communicating with said reactors for receiving desorbed polar gas therefrom, and communicating with said second condenser for receiving condensed polar gas therefrom.

144. The apparatus of claim 143 wherein said reservoir includes a heater cooperating therewith for heating refrigerant for displacing condensed refrigerant liquid from said reservoir to said reactor heat exchange means.

145. The apparatus of claim 131 wherein said first reactors contain a complex compound different from the complex compound in said second reactors.

146. The apparatus of claim 131 comprising a plurality of three or more reactors, each containing a different complex compound said complex compounds having an ascending order of gaseous reactant vapor pressure with the adsorbing temperature of a lower vapor pressure compound at a low reaction pressure being higher than the desorption temperature of the next successive higher vapor pressure compound at a high reaction pressure, and including means for directing heat transfer fluid between said reactors for rejecting heat of adsorption from the highest temperature reactor to the next lower temperature reactor.

147. The apparatus of claim 131 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $FeI_2$, $NiCl_2$, $ZnCl_2$, $SnCl_2$, $MnCl_2$, $MnBr_2$ or $CrCl_2$ or mixtures thereof.

148. The apparatus of claim 147 wherein said heat transfer fluid is ammonia.

149. The apparatus of claim 10 including a reservoir for receiving condensed polar gas from said condenser means and conduits for directing condensed polar gas from said condenser means to said reservoir and for directing liquid polar gas from said reservoir to said evaporator means.

150. The apparatus of claim 149 comprising a single reactor, wherein said condenser means comprises a condenser, and wherein said liquid holding reservoir is located above said reactor and below said condenser, whereby condensed polar gas is gravitationally directed from said condenser to said reservoir.

151. The apparatus of claim 150 wherein said reactor includes a reactor heat exchanger in heat exchange exposure to said complex compound therein, said apparatus including a conduit extending between said reactor heat exchanger and said reservoir and a selectively operated valve for opening and closing said conduit for controlling the flow of condensed polar gas from said reservoir to said reactor heat exchanger to cool said reactor for adsorption.

152. The apparatus of claim 10 including a float control device cooperating with a conduit and said evaporator means for feeding condensed polar gas to said evaporator means.

153. The apparatus of claim 152 wherein said float control device comprises a float chamber having a float therein and a valve actuated by movement of said float for directing condensed polar gas to said evaporator means in response to the position of said float in said float chamber.

154. The apparatus of claim 10 wherein said condenser means comprises one or more condensers and said evaporator means comprises one or more evaporators.

155. The apparatus of claim 94 including a reservoir for receiving condensed polar gas from said heat exchanger and including conduits for directing said condensed polar gas between said reservoir and said heat exchanger.

156. The apparatus of claim 10 wherein said polar gas is ammonia, and wherein said complex compounds are capable of adsorbing and/or desorbing at least 0.02 gram of ammonia per minute per cc of complex compound at reaction times of 30 minutes or less.

157. The apparatus of claim 10 wherein said polar gas is ammonia, and wherein said complex compounds are capable of adsorbing and/or desorbing at least 0.01 gram of ammonia per minute per cc of total reaction chamber volume at reaction times of 30 minutes or less.

158. A method of operating the cooling apparatus of claim 10 wherein said polar gas is ammonia, said method comprising repeatedly alternately adsorbing and desorbing ammonia on said complex compound at adsorption and desorption reactions at cycle time periods of less than about 30 minutes, respectively.

159. The method of claim 158 wherein said reaction rates are carried out to adsorb and/or desorb at least 0.01 gram of ammonia per minute per cc of total reaction chamber volume.

160. The method of claim 158 wherein said reaction rates are carried out to adsorb and/or desorb at least 0.02 gram of ammonia per minute per cc of complex compound.

161. The method of claim 158 wherein rates of reaction are determined by the formula $$\Delta N = \Delta N_{max}(1-e^{-kt})$$

where:

$\Delta N$=reaction extent (moles/mole)

$\Delta N_{max}$=maximum reaction extent (moles/mole)

t=time (sec)

k=reaction kinetics value ($sec^{-1}$)

wherein the reaction is carried out to a reaction extent of up to 4.5 moles/mole, and wherein the minimum value of k is 0.0004.

162. The method of claim 158 wherein rates of reaction are determined by the formula $$\Delta N = \Delta N_{max}(1e^{-kt})$$

where:

ΔN=reaction extent (moles/mole)

ΔN$_{max}$=maximum reaction extent (moles/mole)

t=time (sec)

k=reaction kinetics value (sec$^{-1}$)

wherein the reaction is carried out to a reaction extent of between 4.5 and 6 moles/mole, and wherein the minimum value of k is 0.0003.

163. The method of claim 158 wherein rates of reaction are determined by the formula $$\Delta N = \Delta N_{max}(1-e^{-kt})$$

where:

ΔN =reaction extent (moles/mole)

ΔN$_{max}$=maximum reaction extent (moles/mole)

t=time (sec)

k=reaction kinetics value (sec$^{-1}$)

wherein the reaction is carried out to a reaction extent of above 6 moles/mole, and wherein the minimum value of k is 0.0002.

164. A method of operating the cooling apparatus of claim 10 comprising two of said reactors said method comprising repeatedly alternately adsorbing and desorbing said polar gas on said complex compound wherein the desorption cycle is carried out at least 10% faster than said adsorption cycle.

165. The apparatus of claim 16 wherein said heating means comprises electrical resistance heating means.

166. The apparatus of claim 16 wherein said heating means comprises hot gases of combustion for heating said complex compounds.

167. The apparatus of claim 16 wherein said heating means comprises a heat transfer fluid for heating said complex compounds.

168. The apparatus of claim 16 wherein said heating means comprises one or more heat pipes for heating said complex compounds.

169. The apparatus of claim 16 wherein said apparatus comprises at least one cooling chamber having a volume of up to 1000 liters.

170. The apparatus of claim 16 wherein said apparatus comprises at least one cooling and/or freezing compartment having a volume of between about 1000 and about 30,000 liters.

171. The apparatus of claim 16 wherein said apparatus includes a freezer compartment.

172. The apparatus of claim 165 comprising a portable cooler and/or freezer.

173. The apparatus of claim 172 including a transformer for converting AC to DC for heating said electrical resistance heating means.

174. The apparatus of claim 16 comprising a dispensing or vending machine for products cooled in said cooling chamber.

175. The apparatus of claim 16 wherein said cooling chamber comprises separate refrigeration and freezer compartments, wherein said evaporator means is capable of cooling the freezer compartment to a temperature below about −10° C., and wherein said apparatus includes heat exchanger means for directing cooling from said evaporator means for cooling the refrigeration compartment to a temperature below about 10° C.

176. The apparatus of claim 177 wherein said condenser means comprises a natural convection condenser capable of condensing said polar gas at between about 10° C. and 45° C. above ambient temperature.

177. The apparatus of claim 16 wherein said cooling chamber comprises a refrigeration compartment and wherein said evaporator means is capable of cooling said refrigeration compartment to a temperature below about 10° C.

178. The apparatus of claim 177 wherein the complex compound in said one or more reactors is capable of providing evaporator temperatures of between about −35° C. and about −8° C.

179. The apparatus of claim 177 wherein the complex compound in said one or more reactors is capable of providing a temperature differential between the temperature of said complex compound and the evaporator temperature during adsorption of at least about 450° C.

180. The apparatus of claim 179 wherein said complex compound comprises CACl$_2$.2–4 (NH$_3$), CACl$_2$.4–8 (NH$_3$), or mixtures thereof, SrCl$_2$.1–8 (NH$_3$) or SrBr$_2$.2–8 (NH$_3$).

181. The apparatus of claim 16 wherein said cooling chamber comprises a freezing compartment and wherein said evaporator means is capable of cooling said freezing compartment to a temperature below about −10° C.

182. The apparatus of claim 181 wherein the complex compound in said one or more reactors is capable of providing evaporator temperatures of between about −25° C. and about −45° C.

183. The apparatus of claim 181 wherein the complex compound in said one or more reactors is capable of providing a temperature differential between the temperature of said complex compound and the evaporator temperature during adsorption of at least about 60° C.

184. The apparatus of claim 183 wherein said complex compound comprises CaCl$_2$. X (NH$_3$) complexes, SrCl$_2$.1–8 (NH$_3$), SrBr$_2$.2–8 (NH$_3$), CaBr$_2$.2–6 (NH$_3$), CaI$_2$.2–6 (NH$_3$), FeCl$_2$.2–6 (NH$_3$), FeBr$_2$.2–6 (NH$_3$), FeI$_2$.2–6 (NH$_3$), CoCl$_2$.2–6 (NH$_3$), CoBr$_2$.2–6 (NH$_3$), MgCl$_2$.2–6 (NH$_3$), MgBr$_2$.2–6 (NH$_3$), MnCl$_2$.2–6 (NH$_3$), MnBr$_2$.2–6 (NH$_3$), or mixtures thereof.

185. The cooling apparatus of claim 16 comprising two or more of said reactors each having a different complex compound therein and including means for supplying a heat transfer fluid to and from said reactors and for directing the heat transfer fluid from an exothermic adsorption reaction to a reactor for driving an endothermic desorption reaction.

186. A cooling apparatus of claim 185 comprising three or more reactors, said complex compounds having an ascending order of gaseous reactant vapor pressure wherein the adsorption temperature of a lower vapor pressure complex compound at adsorption pressure is at least 8° C. higher than the desorption temperature of the next successive higher vapor pressure complex compound at desorption pressure.

187. The cooling apparatus of claim 185 wherein a high vapor pressure complex compound is selected from the group consisting of CACl$_2$.4–8 (NH$_3$), CaCl$_2$.2–4 (NH$_3$) and mixtures thereof, SRCl$_2$.1–8 (NH$_3$), BaCl$_2$.0–8 (NH$_3$), LiCl.0–3 (NH$_3$), SrBr$_2$.2–8 (NH$_3$), CaBr$_2$.2–6 (NH$_3$), CuSO$_4$.2–4(NH$_3$), NaBF$_4$.0.5–2.5 (NH$_3$), and NaBr.0–5.25 (NH$_3$), and mixtures thereof.

188. The cooling apparatus of claim 185 wherein a lower vapor pressure complex compound is selected from the group consisting of SrCl$_2$.1–8 (NH$_3$), CaCl$_2$.2–4 (NH$_3$), LiCl.0–3 (NH$_3$), SrBr$_2$.2–8 (NH$_3$), CaBr$_2$.2–6 (NH$_3$), FeCl$_2$.2–6 (NH$_3$), CoCl$_2$.2–6 (NH$_3$), FeBr$_2$.2–6 (NH$_3$), NiCl$_2$.2–6 (NH$_3$), CoBr$_2$.2–6 (NH$_3$), MgCl$_2$.2–6 (NH$_3$), MgBr$_2$.2–6 (NH$_3$), MnCl$_2$.2–6 (NH$_3$), MnBr$_2$.2–6 (NH$_3$), SnCl$_2$.0–2.5 (NH$_3$), CuSO$_4$.2–4 (NH$_3$), and CaCl$_2$.0–1 (NH$_3$), CACl$_2$.1–2 (NH$_3$) and mixtures thereof.

189. The apparatus of claim 16 comprising a plurality of said reactors, said evaporator means including a first evaporator for providing cooling to a first cooling compartment and a second evaporator for providing cooling to a second cooling compartment.

190. The apparatus of claim 191 comprising one or more first reactors and one or more second reactors, said one or more first reactors containing a complex compound having a lower vapor pressure than the complex compound in said one or more second reactors.

191. The apparatus of claim 190 wherein said first evaporator is operatively connected to said one or more first reactors, and wherein said second evaporator is operatively connected to said one or more second reactors.

192. The apparatus of claim 191 including heat transfer components for directing a heat transfer fluid between said first and said second reactors for directing heat of adsorption from said first reactors for driving desorption reactions in said second reactors.

193. The cooling apparatus of claim 185 comprising one or more first reactors and one or more second reactors, said reactors including reactor heat exchange components for directing the heat transfer fluid in heat exchange exposure to the complex compound therein, a heat rejection conduit loop communicating with said reactor heat exchange components for rejecting heat from said one or more first and second reactors during adsorption therein, said loop including a first portion for directing vaporized heat transfer fluid from an adsorbing reactor to said condenser means, and a second portion for directing condensed heat transfer fluid from said condenser means to an adsorbing reactor, a heat transfer fluid located in said heat rejection conduit loop capable of a phase change from liquid to gas at a temperature at or below the temperature of adsorption in an adsorbing reactor, and vapor operated fluid displacement means cooperating with said second portion of said heat rejection conduit loop for displacing liquid phase heat transfer fluid therefrom to reactor heat exchange means.

194. The apparatus of claim 193 wherein said heat transfer fluid is the same composition as said polar gas.

195. The apparatus of claim 193 wherein said fluid displacement means comprises a pump.

196. A cooling apparatus of claim 16 comprising one or more first reactors and one or more second reactors, said reactors including reactor heat exchange means for directing the heat transfer fluid in heat exchange exposure to the complex compound therein, said apparatus including a heat rejection conduit loop communicating with said reactor heat exchange means for rejecting heat from said one or more first and second reactors during adsorption therein, said loop including a first portion for directing vaporized heat transfer fluid from an adsorbing reactor to said condenser means, and a second portion for directing condensed heat transfer fluid from said condenser means to an adsorbing reactor, a heat transfer fluid located in said heat rejection conduit loop capable of a phase change from liquid to gas at a temperature at or below the temperature of adsorption in an adsorbing reactor, and vapor operated fluid displacement means cooperating with said second portion of said heat rejection conduit loop for displacing liquid phase heat transfer fluid therefrom to reactor heat exchange means.

197. The apparatus of claim 196 wherein said heat transfer fluid is the same composition as said polar gas.

198. The apparatus of claim 196 wherein said fluid displacement means comprises a pump.

199. The apparatus of claim 198 wherein said pump comprises a gas operated pump having a generally vertical pipe containing liquid phase heat transfer fluid communicating with said reactor heat exchange means and with a second pipe for directing vaporized heat transfer fluid or desorbed polar gas to drive said liquid phase heat exchange fluid along said vertical pipe.

200. The apparatus of claim 196 wherein said fluid displacement means comprises a reservoir for holding liquid heat transfer fluid and includes one or more ejectors for pumping liquid refrigerant from said reservoir to said reactors.

201. The apparatus of claim 196 wherein said fluid displacement means comprises a heater cooperating with said second portion of said heat rejection conduit loop for heating liquid heat transfer fluid or condensed polar gas therein for pumping liquid heat transfer fluid or condensed polar gas to reactor heat exchange means for cooling an adsorbing reactor.

202. The apparatus of claim 201 including first one-way valves for preventing back flow of heated liquid heat transfer fluid or condensed polar gas along said second portion of said heat rejection conduit loop.

203. The apparatus of claim 196 including passageway means for directing desorbed polar gas from said solid adsorbent to said reactor heat exchange means.

204. The apparatus of claim 203 including a selectively operated valve cooperating with said passageway means and said first portion of said heat rejection conduit loop for selectively directing desorbed polar gas to said reactor heat exchange means during reactor desorption, and selectively directing polar gas from a reactor to a condenser during reactor adsorption.

205. The apparatus of claim 203 including pressure operated valves cooperating with said first portion of said heat rejection conduit loop and said passageway means and responsive to desorbed polar gas pressure for closing during reactor desorption thereby directing desorbed polar to said reactor heat exchange means during reactor desorption, and for opening during reactor adsorption thereby directing polar gas from a reactor to a condenser.

206. The apparatus of claim 202 wherein said condenser means comprises first and second condensers, said first condenser communicating with said heat rejection conduit loop for condensing said heat transfer fluid, and said second condenser communicating with said first and second reactors for condensing desorbed polar gas therefrom.

207. The apparatus of claim 206 including selectively operated valve means cooperating with said heat rejection conduit loop for selectively directing vaporized heat transfer fluid from a reactor to said first condenser during reactor adsorption and for directing heat transfer fluid from reactor heat exchange means to said fluid displacement means during reactor desorption.

208. The apparatus of claim 207, wherein said fluid displacement means comprises a reservoir communicating with said reactors for receiving desorbed polar gas therefrom, and communicating with said second condenser for receiving condensed polar gas therefrom.

209. The apparatus of claim 208 wherein said reservoir includes a heater cooperating therewith for heating refrigerant for displacing condensed refrigerant liquid from said reservoir to said reactor heat exchange means.

210. The apparatus of claim 196 wherein said first reactors contain a complex compound different from the complex compound in said second reactors.

211. The apparatus of claim 196 comprising a plurality of three or more reactors, each containing a different complex compound said complex compounds having an ascending order of gaseous reactant vapor pressure with the adsorbing temperature of a lower vapor pressure compound at a low reaction pressure being higher than the desorption temperature of the next successive higher vapor pressure compound at a high reaction pressure, and including means for directing heat transfer fluid between said reactors for rejecting heat of adsorption from the highest temperature reactor to the next lower temperature reactor.

212. The apparatus of claim 196 wherein said polar gas is ammonia and said metal salt comprises $SrCl_2$, $SrBr_2$, $CaCl_2$, $CaBr_2$, $CaI_2$, $CoCl_2$, $CoBr_2$, $BaCl_2$, $BaBr_2$, $MgCl_2$, $MgBr_2$, $FeCl_2$, $FeBr_2$, $FeI_2$, $NiCl_2$, $ZnCl_2$, $SnCl_2$, $MnCl_2$, $MnBr_2$ or $CrCl_2$ or mixtures thereof.

213. The apparatus of claim 212 wherein said heat transfer fluid is ammonia.

214. The apparatus of claim 16 including a reservoir for receiving condensed polar gas from said condenser means and conduits for directing condensed polar gas from said condenser means to said reservoir and for directing liquid polar gas from said reservoir to said evaporator means.

215. The apparatus of claim 214 comprising a single reactor, wherein said condenser means comprises a condenser, and wherein said liquid holding reservoir is located above said reactor and below said condenser, whereby condensed polar gas is gravitationally directed from said condenser to said reservoir.

216. The apparatus of claim 215 wherein said reactor includes a reactor heat exchanger in heat exchange exposure to said complex compound therein, said apparatus including a conduit extending between said reactor heat exchanger and said reservoir and a selectively operated valve for opening and closing said conduit for controlling the flow of condensed polar gas from said reservoir to said reactor heat exchanger to cool said reactor for adsorption.

217. The apparatus of claim 16 including a float control device cooperating with a conduit and said evaporator means for feeding condensed polar gas to said evaporator means.

218. The apparatus of claim 217 wherein said float control device comprises a float chamber having a float therein and a valve actuated by movement of said float for directing condensed polar gas to said evaporator means in response to the position of said float in said float chamber.

219. The apparatus of claim 16 wherein said condenser means comprises one or more condensers and said evaporator means comprises one or more evaporators.

220. The apparatus of claim 95 including a reservoir for receiving condensed polar gas from said heat exchanger and including conduits for directing said condensed polar gas between said reservoir and said heat exchanger.

221. The apparatus of claim 16 wherein said polar gas is ammonia, and wherein said complex compounds are capable of adsorbing and/or desorbing at least 0.02 gram of ammonia per minute per cc of complex compound at reaction times of 30 minutes or less.

222. The apparatus of claim 16 wherein said polar gas is ammonia, and wherein said complex compounds are capable of adsorbing and/or desorbing at least 0.01 gram of ammonia per minute per cc of total reaction chamber volume at reaction times of 30 minutes or less.

223. A method of operating the cooling apparatus of claim 16 wherein said polar gas is ammonia, said method comprising repeatedly alternately adsorbing and desorbing ammonia on said complex compound at adsorption and desorption reactions at cycle time periods of less than about 30 minutes, respectively.

224. The method of claim 223 wherein said reaction rates are carried out to adsorb and/or desorb at least 0.01 gram of ammonia per minute per cc of total reaction chamber volume.

225. The method of claim 223 wherein said reaction rates are carried out to adsorb and/or desorb at least 0.02 gram of ammonia per minute per cc of complex compound.

226. The method of claim 223 wherein rates of reaction are determined by the formula $$\Delta N = \Delta N_{max}(1 - e^{-kt})$$

where:

$\Delta N$=reaction extent (moles/mole)

$\Delta N_{max}$=maximum reaction extent (moles/mole)

t=time (sec)

k=reaction kinetics value (sec$^{-1}$)

wherein the reaction is carried out to a reaction extent of up to 4.5 moles/mole, and wherein the minimum value of k is 0.0004.

227. The method of claim 223 wherein rates of reaction are determined by the formula $$\Delta N = \Delta N_{max}(1 - e^{-kt})$$

where:

$\Delta N$=reaction extent (moles/mole)

$\Delta N_{max}$=maximum reaction extent (moles/mole)

t=time (sec)

k=reaction kinetics value (sec$^{-1}$)

wherein the reaction is carried out to a reaction extent of between 4.5 and 6 moles/mole, and wherein the minimum value of k is 0.0003.

228. The method of claim 223 wherein rates of reaction are determined by the formula $$\Delta N = \Delta N_{max}(1 - e^{-kt})$$

where:

$\Delta N$=reaction extent (moles/mole)

$\Delta N_{max}$=maximum reaction extent (moles/mole)

t=time (sec)

k=reaction kinetics value (sec$^{-1}$)

wherein the reaction is carried out to a reaction extent of above 6 moles/mole, and wherein the minimum value of k is 0.0002.

229. A method of operating the cooling apparatus of claim 16 comprising two of said reactors said method comprising repeatedly alternately adsorbing and desorbing said polar gas on said complex compound wherein the desorption cycle is carried out at least 10% faster than said adsorption cycle.

* * * * *

UNITED STATES PATENT AND TRADEMARK OFFICE
CERTIFICATE OF CORRECTION

PATENT NO. : 5,628,205

DATED : May 13, 1997

INVENTOR(S) : Uwe Rockenfeller, et al.

It is certified that error appears in the above-identified patent and that said Letters Patent is hereby corrected as shown below:

Column 12, line 41, change "FeI$_2$ • 2-6 (NH$_3$)" (first instance) to --FeBr$_2$ • 2-6 (NH$_3$)--
Column 19, line 20, change "FeCl$_2$ • 2-61 (NH$_3$)" to --FeCl$_2$ • 2-6 (NH$_3$)--.
Column 25, line 26, replace "CACl$_2$" with --CaCl$_2$--.
Column 25, line 26, replace "CACl$_2$" with --CaCl$_2$--.
Column 25, line 27, replace "SRCl$_2$" with --SrCl$_2$--.
Column 25, line 32, replace "about 10°." with --about -10°."
Column 25, line 34, replace "25°C. and" with --25°C and--
Column 25, line 58, replace "least8" with --least 8--.
Column 25, line 63, replace both "CACl$_2$"s with --CaCl$_2$--.
Column 25, line 64, replace "SRCl$_2$" with --SrCl$_2$--.
Column 30, line 64, replace "(N)" with --(NH$_3$).
Column 31, line 49, replace "MgBr.2" with --MgBr$_2$--.
Column 32, line 56, replace both "CACl$_2$"s and replace with "CaCl$_2$".
Column 33, line 26, replace "(NH)" with --(NH$_3$)--.
Column 38, line 14, replace both "CACL$_2$" with --CaCl$_2$--.
Column 38, line 51, replace "CACl$_2$" with --CaCl$_2$--.
Column 38, line 52, replace "SRCl$_2$" with --SrCl$_2$--.
Column 38, line 64, replace "CACl$_2$" with --CaCl$_2$--.
Column 40, line 37, replace "polar to said" with --polar gas to said--.

Signed and Sealed this

Seventeenth Day of March, 1998

Attest:

BRUCE LEHMAN

Attesting Officer

Commissioner of Patents and Trademarks